US012654333B2

(12) United States Patent (10) Patent No.: US 12,654,333 B2
Luo et al. (45) Date of Patent: Jun. 16, 2026

(54) METHOD AND DEVICE FOR OBSTACLE AVOIDANCE CONTROL FOR ROBOT AND COMPUTER-READABLE STORAGE MEDIUM

(71) Applicant: UBTECH ROBOTICS CORP LTD, Shenzhen (CN)

(72) Inventors: Xuan Luo, Shenzhen (CN); Chunyu Chen, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 54 days.

(21) Appl. No.: 19/001,553

(22) Filed: Dec. 26, 2024

(65) Prior Publication Data

US 2025/0214254 A1 Jul. 3, 2025

(30) Foreign Application Priority Data

Dec. 27, 2023 (CN) .......................... 202311835060.0

(51) Int. Cl.
 *B25J 13/08* (2006.01)
 *B25J 9/16* (2006.01)
(52) U.S. Cl.
 CPC ........... *B25J 9/1697* (2013.01); *B25J 9/1602* (2013.01); *B25J 13/08* (2013.01)
(58) Field of Classification Search
 CPC ........ B25J 9/1697; B25J 9/1602; B25J 13/08; B25J 9/1664
 See application file for complete search history.

(56) References Cited

U.S. PATENT DOCUMENTS

2025/0018570 A1* 1/2025 Shazly ................... B25J 9/1664

OTHER PUBLICATIONS

Cheng et al., RMPflow: A Geometric Framework for Generation of Multi-Task Motion Policies, Jul. 25, 2020 (Year: 2020).*
Ratliff et al., Riemannian Motion Policies, Jul. 25, 2018 (Year: 2018).*

* cited by examiner

*Primary Examiner* — Adam R Mott
*Assistant Examiner* — Heather J Keniry

(57) ABSTRACT

An obstacle avoidance control method for a robot includes: obtaining, by a depth camera perception system, envelope motion information of each movable obstacle in a target operating environment in a current control cycle, and accessing a pre-stored actual voxel block position of each environmental obstacle in the target operating environment, wherein the actual voxel block position of each environmental obstacle was measured by the depth camera perception system before the movable obstacles were present in the target operating environment; and determining a number of target obstacles that need to be avoided by a number of key obstacle-avoidance parts of a target robot in the target operating environment according to all of the envelope motion information and all of the actual voxel block positions.

18 Claims, 10 Drawing Sheets

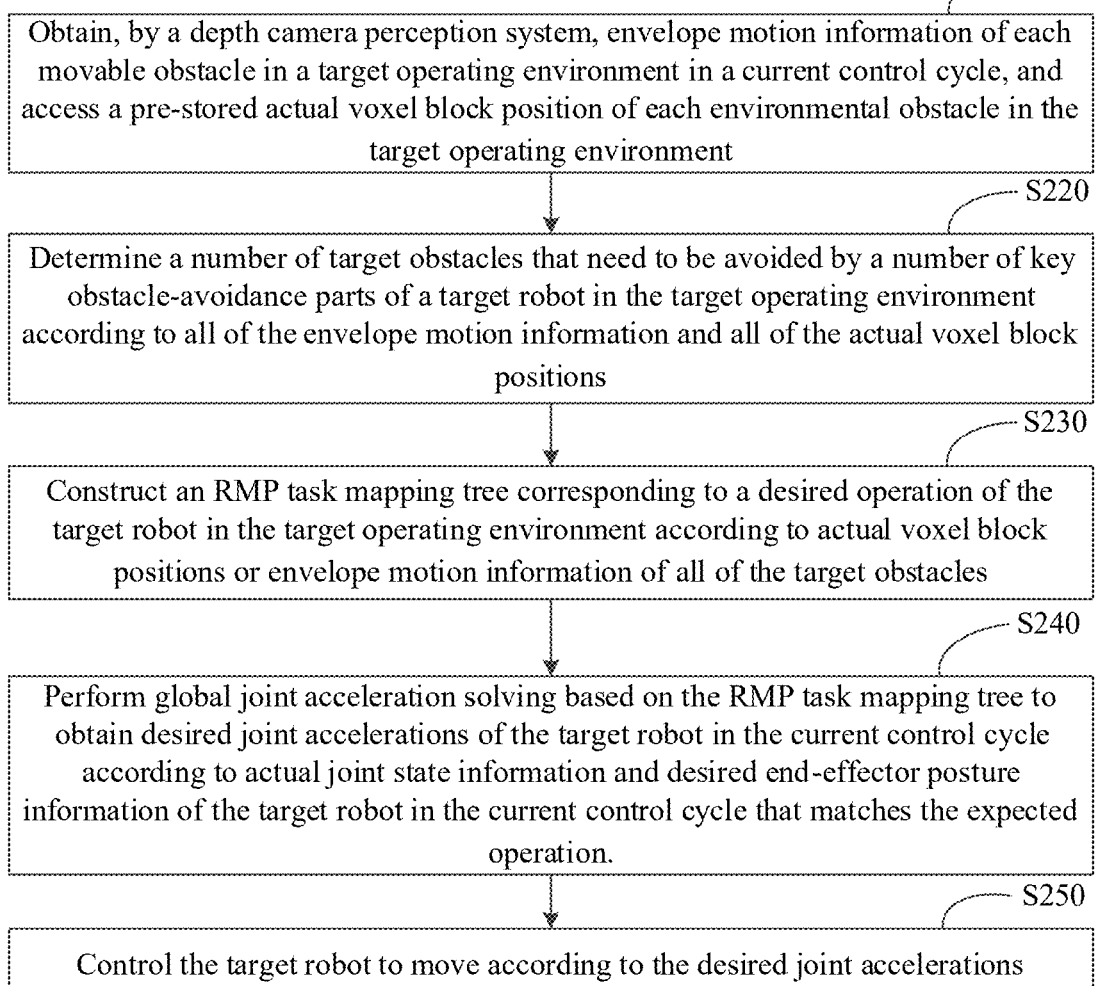

S210

Obtain, by a depth camera perception system, envelope motion information of each movable obstacle in a target operating environment in a current control cycle, and access a pre-stored actual voxel block position of each environmental obstacle in the target operating environment

S220

Determine a number of target obstacles that need to be avoided by a number of key obstacle-avoidance parts of a target robot in the target operating environment according to all of the envelope motion information and all of the actual voxel block positions

S230

Construct an RMP task mapping tree corresponding to a desired operation of the target robot in the target operating environment according to actual voxel block positions or envelope motion information of all of the target obstacles

S240

Perform global joint acceleration solving based on the RMP task mapping tree to obtain desired joint accelerations of the target robot in the current control cycle according to actual joint state information and desired end-effector posture information of the target robot in the current control cycle that matches the expected operation.

S250

Control the target robot to move according to the desired joint accelerations

Figure 4:
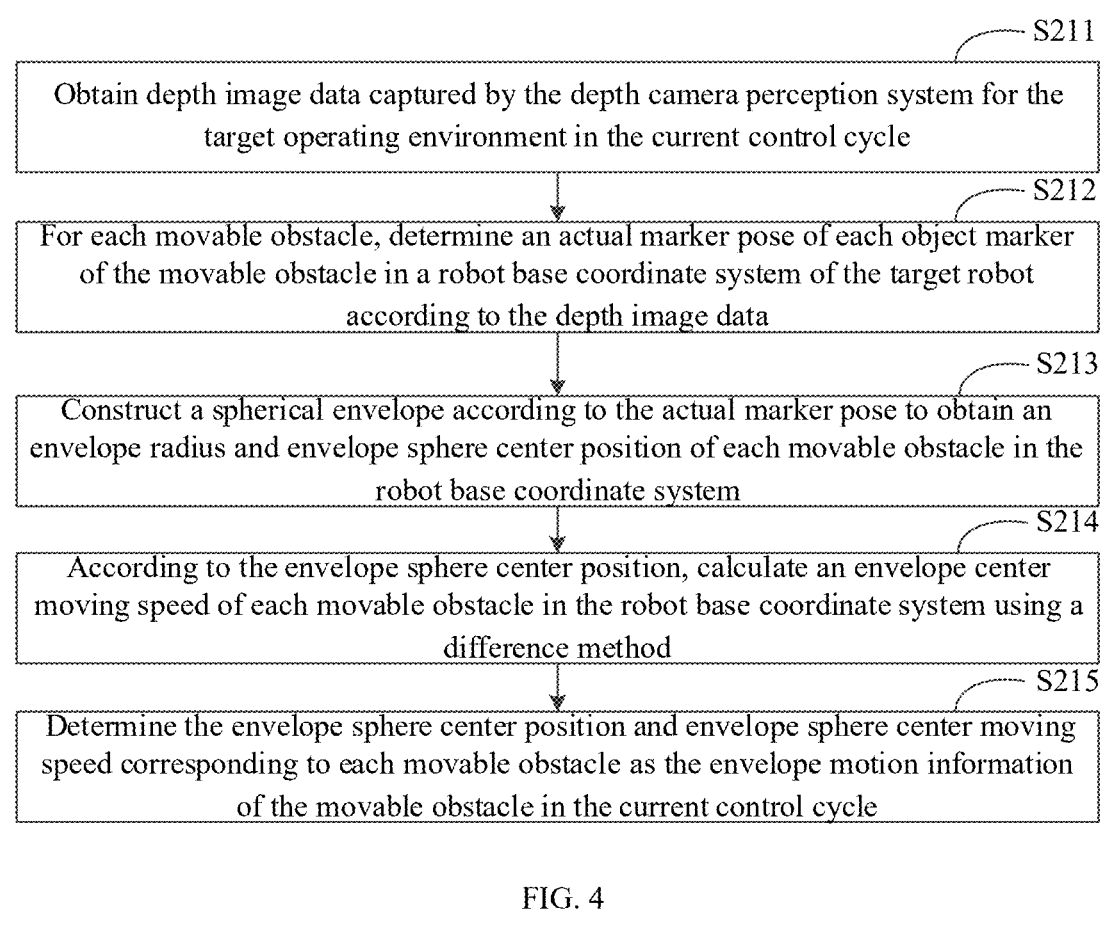

Obtain depth image data captured by the depth camera perception system for the target operating environment in the current control cycle

S212

For each movable obstacle, determine an actual marker pose of each object marker of the movable obstacle in a robot base coordinate system of the target robot according to the depth image data

S213

Construct a spherical envelope according to the actual marker pose to obtain an envelope radius and envelope sphere center position of each movable obstacle in the robot base coordinate system

S214

According to the envelope sphere center position, calculate an envelope center moving speed of each movable obstacle in the robot base coordinate system using a difference method

S215

Determine the envelope sphere center position and envelope sphere center moving speed corresponding to each movable obstacle as the envelope motion information of the movable obstacle in the current control cycle

Figure 5:
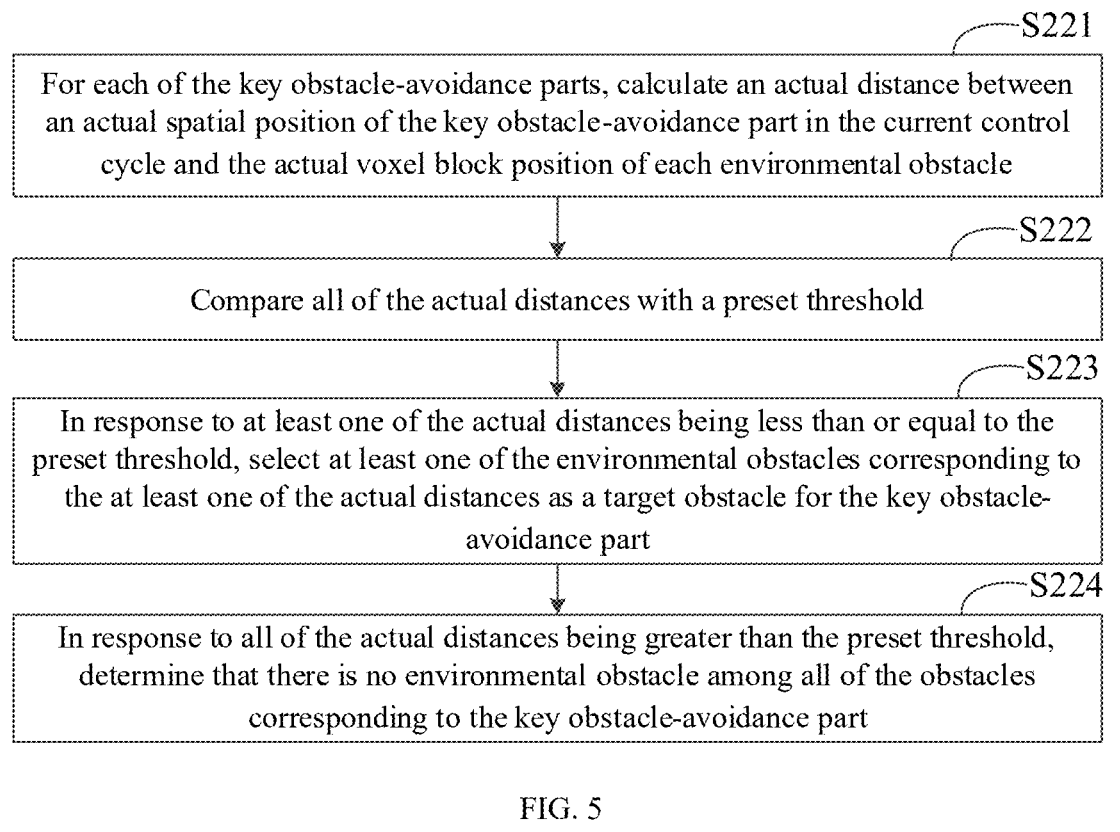

For each of the key obstacle-avoidance parts, calculate an actual distance between an actual spatial position of the key obstacle-avoidance part in the current control cycle and the actual voxel block position of each environmental obstacle

S222

Compare all of the actual distances with a preset threshold

S223

In response to at least one of the actual distances being less than or equal to the preset threshold, select at least one of the environmental obstacles corresponding to the at least one of the actual distances as a target obstacle for the key obstacle-avoidance part

S224

In response to all of the actual distances being greater than the preset threshold, determine that there is no environmental obstacle among all of the obstacles corresponding to the key obstacle-avoidance part

Figure 6:
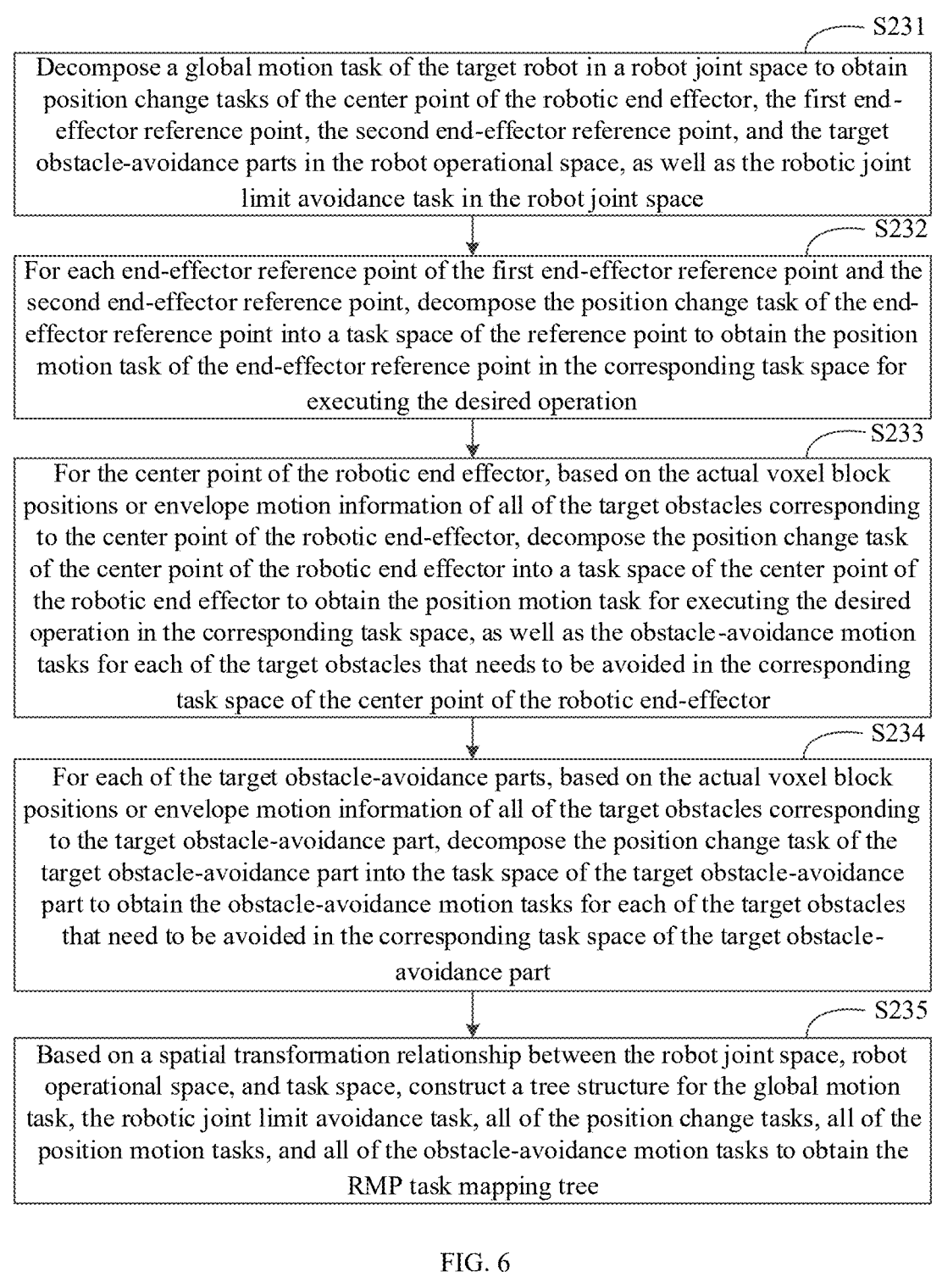

Decompose a global motion task of the target robot in a robot joint space to obtain position change tasks of the center point of the robotic end effector, the first end-effector reference point, the second end-effector reference point, and the target obstacle-avoidance parts in the robot operational space, as well as the robotic joint limit avoidance task in the robot joint space

S232

For each end-effector reference point of the first end-effector reference point and the second end-effector reference point, decompose the position change task of the end-effector reference point into a task space of the reference point to obtain the position motion task of the end-effector reference point in the corresponding task space for executing the desired operation

S233

For the center point of the robotic end effector, based on the actual voxel block positions or envelope motion information of all of the target obstacles corresponding to the center point of the robotic end-effector, decompose the position change task of the center point of the robotic end effector into a task space of the center point of the robotic end effector to obtain the position motion task for executing the desired operation in the corresponding task space, as well as the obstacle-avoidance motion tasks for each of the target obstacles that needs to be avoided in the corresponding task space of the center point of the robotic end-effector

S234

For each of the target obstacle-avoidance parts, based on the actual voxel block positions or envelope motion information of all of the target obstacles corresponding to the target obstacle-avoidance part, decompose the position change task of the target obstacle-avoidance part into the task space of the target obstacle-avoidance part to obtain the obstacle-avoidance motion tasks for each of the target obstacles that need to be avoided in the corresponding task space of the target obstacle-avoidance part

S235

Based on a spatial transformation relationship between the robot joint space, robot operational space, and task space, construct a tree structure for the global motion task, the robotic joint limit avoidance task, all of the position change tasks, all of the position motion tasks, and all of the obstacle-avoidance motion tasks to obtain the RMP task mapping tree

Figure 8:
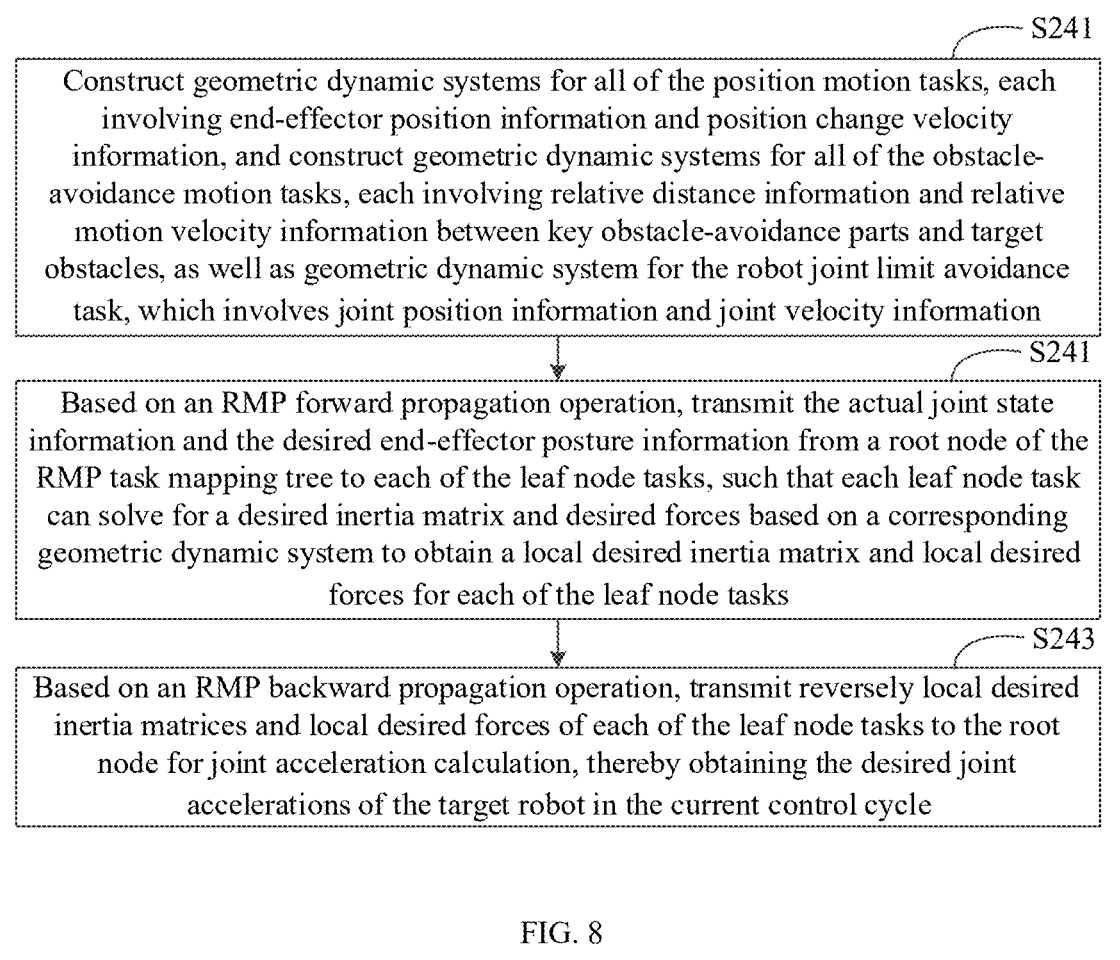

Construct geometric dynamic systems for all of the position motion tasks, each involving end-effector position information and position change velocity information, and construct geometric dynamic systems for all of the obstacle-avoidance motion tasks, each involving relative distance information and relative motion velocity information between key obstacle-avoidance parts and target obstacles, as well as geometric dynamic system for the robot joint limit avoidance task, which involves joint position information and joint velocity information

S241

Based on an RMP forward propagation operation, transmit the actual joint state information and the desired end-effector posture information from a root node of the RMP task mapping tree to each of the leaf node tasks, such that each leaf node task can solve for a desired inertia matrix and desired forces based on a corresponding geometric dynamic system to obtain a local desired inertia matrix and local desired forces for each of the leaf node tasks

S243

Based on an RMP backward propagation operation, transmit reversely local desired inertia matrices and local desired forces of each of the leaf node tasks to the root node for joint acceleration calculation, thereby obtaining the desired joint accelerations of the target robot in the current control cycle

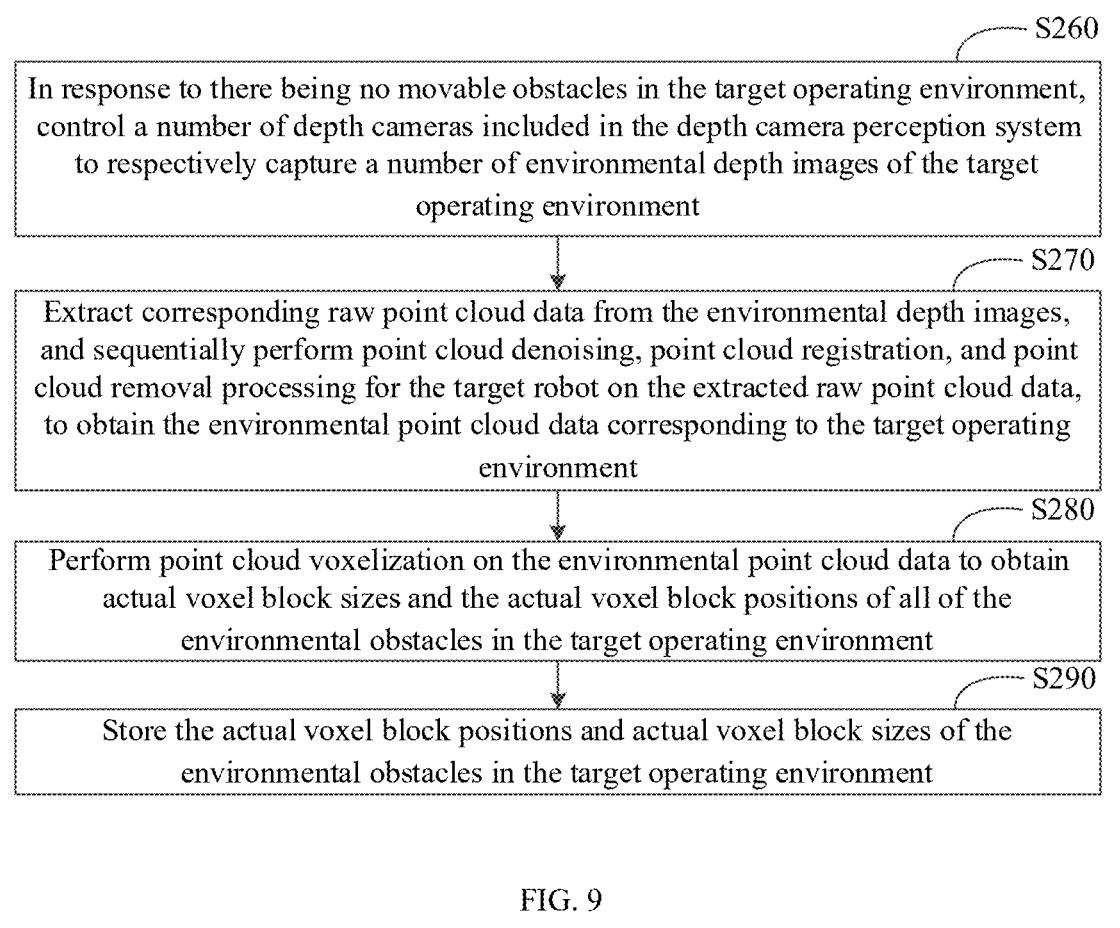

In response to there being no movable obstacles in the target operating environment, control a number of depth cameras included in the depth camera perception system to respectively capture a number of environmental depth images of the target operating environment

S270

Extract corresponding raw point cloud data from the environmental depth images, and sequentially perform point cloud denoising, point cloud registration, and point cloud removal processing for the target robot on the extracted raw point cloud data, to obtain the environmental point cloud data corresponding to the target operating environment

S280

Perform point cloud voxelization on the environmental point cloud data to obtain actual voxel block sizes and the actual voxel block positions of all of the environmental obstacles in the target operating environment

S290

Store the actual voxel block positions and actual voxel block sizes of the environmental obstacles in the target operating environment

FIG. 9

METHOD AND DEVICE FOR OBSTACLE AVOIDANCE CONTROL FOR ROBOT AND COMPUTER-READABLE STORAGE MEDIUM

CROSS REFERENCE TO RELATED APPLICATIONS

This application claims priority to Chinese Patent Application No. CN 202311835060.0, filed Dec. 27, 2023, which is hereby incorporated by reference herein as if set forth in its entirety.

TECHNICAL FIELD

The present disclosure generally relates to robot control technologies, and in particular relates to a method and device for obstacle avoidance control and computer-readable storage medium.

BACKGROUND

With the continuous development of science and technology, the application of robotic technology in various industries has become increasingly widespread. Robots often need to avoid various obstacles in their operating environment during the execution of desired tasks to prevent issues such as robot damage or failure to execute the desired tasks due to collisions with obstacles. In the actual operation of robots, the obstacles in the robot's operating environment are not necessarily all static; they typically consist of a mix of static environmental obstacles and dynamic obstacles formed by movable objects.

Generally, conventional robot obstacle avoidance solutions typically use perception systems to continuously feed back point cloud position information of static environmental obstacles and dynamic obstacles in the operating environment. Based on the obtained point cloud position data, the artificial potential field method is used to generate repulsive motion for the obstacle point clouds that are closest to the robot's collision point, aiming to avoid obstacles. However, it should be noted that this robot obstacle avoidance solution is often limited by the efficiency of point cloud data processing, which requires extending the computation cycle for the robot's avoidance control operations. This leads to a difficulty in increasing the robot's movement speed and makes real-time obstacle avoidance impossible. Additionally, due to the limitations of the artificial potential field method, the robot obstacle avoidance solution is prone to getting stuck in local minima due to insufficient dynamic agility, ultimately failing to avoid various obstacles in the operating environment with high agility. Therefore, how to achieve high agility and real-time obstacle avoidance for the various obstacles that actually affect the robot's tasks in the operating environment is an important technical challenge in the field of robot control technology today.

Therefore, there is a need to provide an obstacle avoidance control method to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

FIG. 3 is an exemplary flowchart of the obstacle avoidance control method according to one embodiment.

FIG. 4 is an exemplary flowchart of the sub-steps included in step S210 in FIG. 3.

FIG. 5 is an exemplary flowchart of the sub-steps included in step S220 in FIG. 3.

FIG. 6 is an exemplary flowchart of the sub-steps included in step S230 in FIG. 3.

FIG. 8 is an exemplary flowchart of the sub-steps included in step S240 of FIG. 3.

FIG. 9 is an exemplary flowchart of an obstacle avoidance control method according to another embodiment

DETAILED DESCRIPTION

Figure 1:
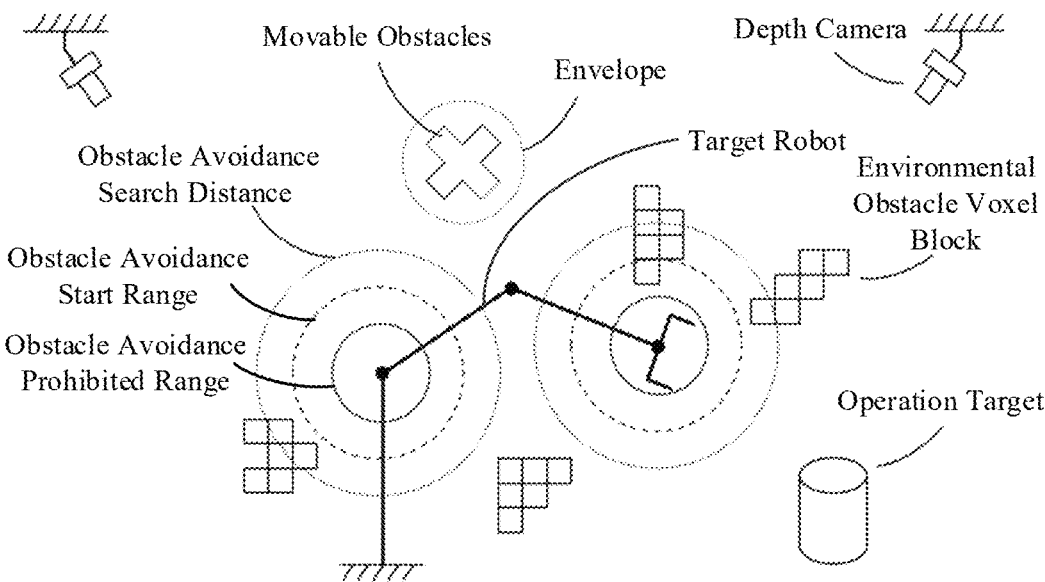
FIG. 1 is a schematic diagram of the deployment of a target robot and a depth camera perception system according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

FIG. 1 is a schematic diagram of the deployment of a target robot and a depth camera perception system according to one embodiment. In the embodiment, the target robot (e.g., a robotic arm) can be deployed within an operating environment and perform complex operation tasks (e.g., grabbing operation targets and moving them to a specific position) for one or more operation targets in the operating environment. A depth camera perception system is deployed in the operating environment. The depth camera perception system includes multiple depth cameras, each of which is fixedly installed at a higher position in the corresponding operating environment to ensure that the combined field of view of the multiple depth cameras can cover the entire operating environment. For static environmental obstacles in the operating environment, a one-time scene capture and a series of point cloud information processing can be performed by the depth camera perception system before the target robot executes a task. This allows the use of 3D point clouds to voxelize the static environmental obstacles and represent the actual positions of the corresponding static environmental obstacles within the operating environment through the actual voxel block positions of the environmental obstacle voxel blocks. At this point, there are no movable obstacles in the operating environment. When movable obstacles are present in the operating environment, the depth camera perception system can perform real-time scene capture of the operating environment during the execution of the task by the target robot. Based on the captured environmental data, the marked movable obstacles are enveloped, enabling real-time monitoring of the envelope motion information of dynamic obstacles (including the envelope sphere center position, envelope sphere movement velocity, etc.). The target robot can be a redundant robot with a serial/parallel configuration controlled by position control, force control, or hybrid force-position control. It can also be a redundant manipulator, quadruped robot, or humanoid robot applied in fields such as industry, services, and specialized industries.

In one embodiment, a robot control device can be communicatively connected to the target robot and the depth camera perception system, respectively, to store the voxel block information (including actual voxel block positions and actual voxel block sizes) of environmental obstacles obtained by the depth camera perception system before the target robot executes a task, for future use. During the execution of the task by the target robot, the robot control device can then retrieve the envelope motion information corresponding to each movable obstacle in real time from the depth camera perception system. By coordinating the static obstacle information reading operation and the dynamic obstacle information real-time monitoring operation, the processing speed of obstacle perception information for the robot's operating environment is improved, enabling the depth camera perception system's obstacle perception frequency to better match the robot's motion frequency, thereby enhancing the robot's obstacle avoidance real-time performance. The robot control device, while controlling the target robot to perform complex operational tasks, takes into account the interference of various obstacles in the operating environment on the robot's movement during the task execution. Using an RMP framework, the robot control device enables the target robot to perform highly agile and real-time reactive obstacle avoidance in response to the obstacles that actually affect the robot's operation, ensuring that the obstacle avoidance effectiveness of the robot is effectively adapted to the actual environmental conditions of the robot's operating environment. The obstacles that actually affect the robot's operation are those static environmental obstacles and/or dynamic object obstacles that pose a collision risk to the target robot. The robot control device can be a computer device independent of the target robot, or a hardware module device integrated with the target robot. In one embodiment, the computer device can be a personal computer, a cloud server, a laptop, a tablet computer, etc.

Figure 2:
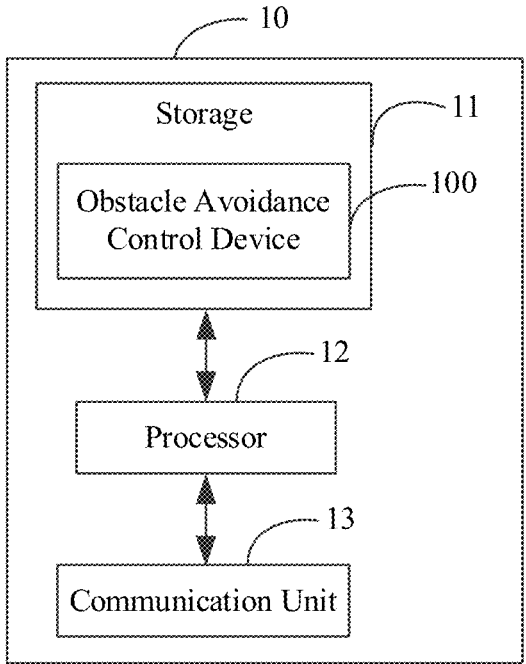
FIG. 2 is a schematic block diagram of a robot control device according to one embodiment.

FIG. 2 is a schematic block diagram of a robot control device 10 according to one embodiment. The robot control device 10 may include a storage 11, a processor 12, and a communication unit 13. The storage 11, the processor 12, and the communication unit 13 are electrically connected to each other directly or indirectly to achieve data transmission or interaction. For example, the storage 11, the processor 12, and the communication unit 13 may be electrically connected to each other through one or more communication buses or signal lines. The processor 12 performs corresponding operations by executing the executable computer programs stored in the storage 11. When the processor 12 executes the computer programs, the steps in the embodiments of the obstacle avoidance control method, such as steps S210 to S250 in FIG. 3 are implemented.

The processor 12 may be an integrated circuit chip with signal processing capability. The processor 12 may be a central processing unit (CPU), a general-purpose processor, a graphics processing unit (GPU), a network processor (NP), a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 12 can implement or execute the methods, steps, and logical blocks disclosed in the embodiments of the present disclosure.

The storage 11 may be, but not limited to, a random-access memory (RAM), a read only memory (ROM), a programmable read only memory (PROM), an erasable programmable read-only memory (EPROM), and an electrical erasable programmable read-only memory (EE-PROM). The storage 11 may be an internal storage unit of the device 10, such as a hard disk or a memory. The storage 11 may also be an external storage device of the device 10, such as a plug-in hard disk, a smart memory card (SMC), and a secure digital (SD) card, or any suitable flash cards. Furthermore, the storage 11 may also include both an internal storage unit and an external storage device. The storage 11 is to store computer programs, other programs, and data required by the device 10. The storage 11 can also be used to temporarily store data that have been output or is about to be output. After receiving an execution instruction, the processor 12 can execute one or more computer programs accordingly. The storage 11 can store voxel block information of environmental obstacle blocks perceived by the depth camera perception system for each static environmental obstacle in the robot's operating environment. This allows the robot control device 10, during the execution of complex operational tasks by the target robot, to directly determine the obstacle information of each static environmental obstacle in the robot's operating environment through voxel block information reading operations. This avoids the repetitive execution of time-consuming point cloud data processing for static environmental obstacles, thereby improving the speed of obstacle perception information processing in the robot's operating environment and ensuring real-time obstacle avoidance for the robot.

Figure 10:
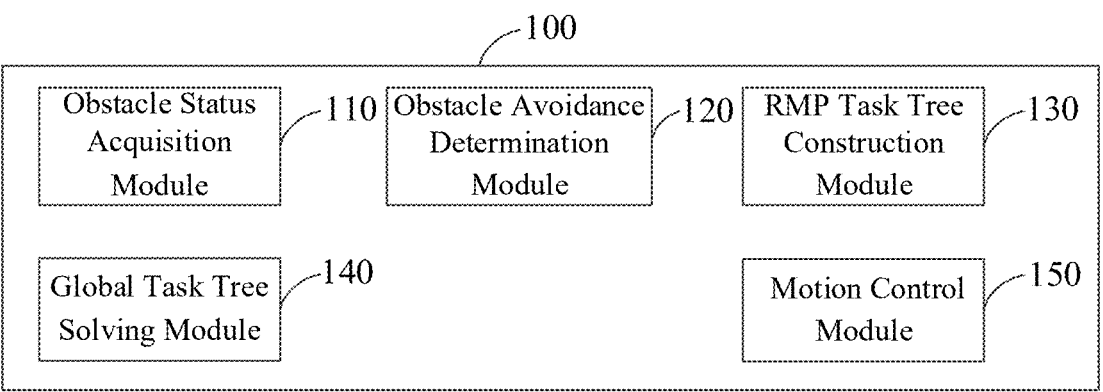
FIG. 10 is a schematic block diagram of an obstacle avoidance control device according to one embodiment.

Exemplarily, the one or more computer programs stored in the storage 11 may be divided into one or more modules/units, and the one or more modules/units are stored in the storage 11 and executable by the processor 12. The one or more modules/units may be a series of computer program instruction segments capable of performing specific functions, and the instruction segments are used to describe the execution process of the one or more computer programs in the device 10. For example, the one or more computer programs may be divided into an obstacle status acquisition module 110, an obstacle avoidance determination module 120, an RMP task tree construction module 130, a global task tree solving module 140, and a motion control module 150 as shown in FIG. 10.

The communication unit 13 is to establish a communication connection between the robot control device 10 and other electronic devices through a network, and to send and receive data through the network. The network includes a wired communication network and/or a wireless communication network. For example, the robot control device 10 can obtain the motion trajectory information of the desired task to be executed by the robotic end effector of the target robot from an operation planning device via the communication unit 13. The motion trajectory information may include the end-effector's desired pose information during the execution of the desired task at different control cycles. The robot control device 10 can then send joint control commands to the target robot via the communication unit 13 to drive the target robot to move according to the received joint control commands.

In one embodiment, an obstacle avoidance control device 100 (see FIGS. 10 and 11) may include at least one software function module that can be stored in the storage 11 in the form of software or firmware or embedded in the operating system of the device 10. The processor 12 can execute the executable modules stored in the storage 11, such as the software function modules and computer programs included in the obstacle avoidance control device 100. The robot control device 10, through the robot obstacle avoidance control device 100, can adopt different perception methods for static environmental obstacles and dynamic object obstacles in the robot's operating environment. This approach avoids the repetitive execution of time-consuming point cloud data processing for static environmental obstacles and achieves real-time monitoring of the motion conditions of dynamic object obstacles, thus improving the real-time obstacle avoidance performance of the robot. Additionally, it deeply considers the interference of various obstacles in the operating environment on the robot's movement during the task execution. Using an RMP framework, the robot is controlled to perform highly agile and real-time reactive obstacle avoidance for various obstacles that actually affect the robot's operation, ensuring that the robot's obstacle avoidance effectiveness is effectively adapted to the actual environmental conditions of the robot's operating environment.

It should be noted that the block diagram shown in FIG. 2 is only an example of the device 10. The device 10 may include more or fewer components than what is shown in FIG. 2, or have a different configuration than what is shown in FIG. 1. Each component shown in FIG. 1 may be implemented in hardware, software, or a combination thereof.

In summary, to ensure that the robot control device 10 can deeply consider the interference of various obstacles in the operating environment on the robot's movement during the task execution, the RMP framework is used to control the target robot to perform highly agile and real-time reactive obstacle avoidance for the various obstacles that actually affect the robot's operation during task execution. This ensures that the robot's obstacle avoidance effectiveness is effectively adapted to the actual environmental conditions of the robot's operating environment. The present disclosure provides an obstacle avoidance control method to achieve the aforementioned objectives. The following is a detailed description of the obstacle avoidance control method provided by the present disclosure.

FIG. 3 is an exemplary flowchart of the obstacle avoidance control method according to one embodiment. In this embodiment, the robot obstacle avoidance control method can be implemented by the device 10. The obstacle avoidance control method can include steps S210 to S250.

Step S210: Obtain, by a depth camera perception system, envelope motion information of each movable obstacle in a target operating environment in a current control cycle, and access a pre-stored actual voxel block position of each environmental obstacle in the target operating environment.

The target operating environment is the operating environment where the target robot is currently located. The voxel block information of each environmental obstacle was measured by the depth camera perception system before the movable obstacles were present in the target operating environment. The robot control device 10 can read the pre-stored voxel block information of each of the multiple environmental obstacle voxel blocks corresponding to the target operating environment from the storage 11 through a static obstacle information reading operation, so as to obtain the actual voxel block position included in the voxel block information corresponding to each environmental obstacle in the target operating environment. The robot control device 10 can obtain the environmental depth image data captured by the depth camera perception system for the target operating environment in real time. Then, for the obtained environmental depth image data, the marked movable obstacles are individually enveloped, enabling real-time monitoring of the envelope motion information of each movable obstacle (including the envelope sphere center position, envelope sphere movement velocity, etc.).

Thus, in this application, by adopting different perception approaches for static environmental obstacles and dynamic object obstacles in the robot's operating environment, it can avoid the repetitive execution of time-consuming point cloud data processing for static environmental obstacles and achieve real-time monitoring of the motion conditions of dynamic object obstacles, thereby enhancing the real-time obstacle avoidance performance of the robot.

FIG. 4 is a flowchart of the sub-steps included in step S210 in FIG. 3. In one embodiment, the step of obtaining, by the depth camera perception system, envelope motion information of each movable obstacle in a target operating environment in a current control cycle in step S210 can include steps S211 to S215, in order to improve the processing speed of dynamic obstacle perception information. This ensures that the overall efficiency of obtaining dynamic obstacle motion information through the depth camera perception system can further match the robot's motion frequency, thereby enhancing the real-time performance of the robot's obstacle avoidance.

Step S211: Obtain depth image data captured by the depth camera perception system for the target operating environment in the current control cycle.

The depth image data includes the depth images captured by each depth camera in the depth camera perception system during the current control cycle for the target operating environment.

Step S212: For each movable obstacle, determine an actual marker pose of each object marker of the movable obstacle in a robot base coordinate system of the target robot according to the depth image data.

In one embodiment, each movable obstacle in the target operating environment can be marked with at least one object marker (e.g., a QR code marker) to roughly constrain the distribution of the edge regions of the corresponding movable obstacle's spherical envelope body based on the at least one object marker on each movable obstacle. Therefore, after the robot control device 10 obtains the depth image data corresponding to the current control cycle, it will determine the homogeneous transformation matrix $^{end}T_{cam}$ of the camera coordinate system of the depth camera relative to the robotic end-effector coordinate system, and determine the homogeneous transformation matrix $^{base}T_{end}$ of the robot end-effector coordinate system relative to the robot base coordinate system according to the robot kinematic model, and determine the homogeneous transformation matrix (i.e., $^{base}T_{cam}=^{base}T_{end}{}^{end}T_{cam}$) of the camera coordinate system relative to the robot base coordinate system. Then, for each depth image, the robot control device 10 determines the first marker pose of the object marker of each movable obstacle in the camera coordinate system corresponding to the depth image, and perform coordinate system transformation on the first marker pose according to the homogeneous transformation matrix of the camera coordinate system relative to the robot base coordinate system to obtain the actual marker pose of the object marker of the movable obstacle in the robot base coordinate system.

Step S213: Construct a spherical envelope according to the actual marker pose to obtain an envelope radius and envelope sphere center position of each movable obstacle in the robot base coordinate system.

After the robot control device 10 determines the actual marker pose of each movable obstacle in the robot base coordinate system corresponding to the current control cycle in the target operating environment, it will, based on the basic shape of the movable obstacle and its actual marker pose, define a spherical envelope body in the robot base coordinate system that effectively encloses the movable obstacle. This will allow the determination of the envelope sphere center position and the envelope radius of the obstacle's envelope body.

Step S214: According to the envelope sphere center position, calculate an envelope center moving speed of each movable obstacle in the robot base coordinate system using a difference method.

Step S215: Determine the envelope sphere center position and envelope sphere center moving speed corresponding to each movable obstacle as the envelope motion information of the movable obstacle in the current control cycle.

By executing the above steps S211 to S215, the processing speed of dynamic obstacle perception information is improved, ensuring that the overall efficiency of obtaining dynamic obstacle motion information through the depth camera perception system can further match the robot's motion frequency, thereby enhancing the real-time obstacle avoidance performance of the robot.

Step S220: Determine a number of target obstacles that need to be avoided by a number of key obstacle-avoidance parts of a target robot in the target operating environment according to all of the envelope motion information and all of the actual voxel block positions.

In one embodiment, after the robot control device 10 determines the actual voxel block position of each environmental obstacle in the target operating environment and the envelope motion information of each movable obstacle in the target operating environment in the current control cycle, it will determine which obstacles may interfere with the motion of the key obstacle-avoidance part from among the many obstacles according to the actual voxel block position of each environmental obstacle in the target operating environment and the envelope motion information of each movable obstacle for each key obstacle-avoidance part of the target robot including the center point of the robotic end effector. Then, all the determined obstacles can be determined as target obstacles that the key obstacle-avoidance parts need to avoid in the operating environment.

In another embodiment, based on the obtained envelope motion information of each movable obstacle in the current control cycle, the estimated position of the envelope sphere center of each movable obstacle at the end of the current control cycle can be predicted. Then, for each key obstacle-avoidance part of the target robot, according to the envelope radius and the estimated position of the envelope sphere center of each movable obstacle in the current control cycle, and the actual spatial position of the key obstacle-avoidance part in the current control cycle, the shortest length distance from the key obstacle-avoidance part to the obstacle envelope of each movable obstacle is calculated. Then, each target movable obstacle with a corresponding shortest length distance less than or equal to a preset obstacle avoidance search distance is used as a target obstacle of the key obstacle-avoidance part in the current control cycle. Here, the preset obstacle avoidance search distance represents the obstacle avoidance search range corresponding to the key obstacle-avoidance part in FIG. 1, and the obstacle envelope corresponding to the target movable obstacle at least partially enters the obstacle avoidance search range of the key obstacle-avoidance part.

In another embodiment, in order to prevent movable obstacles from causing serious motion interference to the robot due to unpredictable movement conditions, for each key obstacle-avoidance part of the target robot, all movable obstacles in the target operating environment can be directly used as target obstacles for the key obstacle-avoidance part in the current control cycle.

FIG. 5 is an exemplary flowchart of the sub-steps included in step S220 in FIG. 3. In this embodiment, step S220 may include sub-steps S221 to S224, so as to effectively determine the target obstacles that each of the key obstacle-avoidance parts of the target robot needs to avoid respectively among the numerous static environmental obstacles in the target operating environment.

Step S221: For each of the key obstacle-avoidance parts, calculate an actual distance between an actual spatial position of the key obstacle-avoidance part in the current control cycle and the actual voxel block position of each environmental obstacle.

The actual distance represents the shortest distance from the key obstacle-avoidance part to the surface of the environmental obstacle voxel block corresponding to a certain environmental obstacle.

Step S222: Compare all of the actual distances with a preset threshold.

Step S223: In response to at least one of the actual distances being less than or equal to the preset threshold, select at least one of the environmental obstacles corresponding to the at least one of the actual distances as a target obstacle for the key obstacle-avoidance part.

Step S224: In response to all of the actual distances being greater than the preset threshold, determine that there is no environmental obstacle among all of the obstacles corresponding to the key obstacle-avoidance part.

After determining that there are one or more environmental obstacles, each with an actual distance less than or equal to the preset threshold, around a key obstacle-avoidance part, one or more target environmental obstacles, with a total number not exceeding a preset number threshold (e.g., 3 or 4), can be randomly selected from the one or more environmental obstacles corresponding to the key obstacle-avoidance part as the target obstacles of the key obstacle-avoidance part. Alternatively, the target environmental obstacles closest to the key obstacle-avoidance part, with a total number not exceeding the preset threshold, can be selected as the target obstacles for that key obstacle-avoidance part. When it is determined that all the environmental obstacles around a key obstacle-avoidance part have an actual distance greater than the preset threshold, it means that any static environmental obstacle in the target operating environment will not affect the motion of the key obstacle-avoidance part. In this case, there is no environmental obstacle among all of the obstacles corresponding to the key obstacle-avoidance part.

By executing the above steps S221 to S224, the target obstacles that each key obstacle-avoidance part of the target robot needs to avoid are effectively determined from the numerous static environmental obstacles in the target operating environment.

Step S230: Construct an RMP task mapping tree corresponding to a desired operation of the target robot in the target operating environment according to actual voxel block positions or envelope motion information of all of the target obstacles.

In one embodiment, after the robot control device 10 determines the target obstacles that each of the multiple key obstacle-avoidance parts of the target robot actually needs to avoid in the current control cycle, it will construct an RMP task mapping tree for the target robot to perform the desired operation in the target operating environment in the current control cycle based on the RMP framework according to the actual voxel block positions or envelope motion information of all target obstacles corresponding to different key obstacle-avoidance parts. The root node task of the RMP task mapping tree is the global motion task of the target robot in the robot joint space. The leaf node tasks of the RMP task mapping tree include a robotic joint limit avoidance task, a pose variation task for a robotic end effector to perform the desired operation, and obstacle avoidance motion tasks for the key obstacle-avoidance parts to avoid corresponding target obstacles. The robotic joint limit avoidance task represents the motion task in which each robotic joint of the target robot continuously moves within the joint limit position range and the joint acceleration control range. The pose variation task represents the motion task in which the robotic end effector of the target robot executes the desired operation in terms of pose dimensions. The obstacle avoidance motion tasks represent the motion tasks in which the key obstacle-avoidance parts of the target robot avoid the corresponding matched target obstacles. The global motion task represents the motion task in which the target robot simultaneously achieves the execution effects of the robotic joint limit avoidance task, the pose variation task, and the obstacle avoidance motion tasks.

The pose variation task can be decomposed into the position motion tasks of the center point of the robotic end effector, a first end-effector reference point and a second end-effector reference point with fixed relative postures during the execution of the desired operation. The center point of the robotic end effector, the first end-effector reference point and the second end-effector reference point are all on the robotic end-effector of the target robot. The position motion tasks represent the motion tasks in which the corresponding end part (e.g., any one of the center point of the robotic end effector, the first end-effector reference point, and the second end-effector reference point) executes the desired operation in terms of position dimensions. The multiple key obstacle avoidance parts involved in the target robot include the center point of the robotic end effector and multiple target obstacle-avoidance parts.

The RMP framework essentially refers to a motion strategy with geometric information described by second-order differential equations in a Riemannian manifold space. The mathematical canonical form of RMP can be represented as $(a, M)^{\mathcal{X}}$ and the mathematical natural form of RMP can be represented as $[f, M]^{\mathcal{X}}$, where $\mathcal{X}$ denotes the m-dimensional Riemannian manifold space whose spatial coordinates belong to $R^{m\mu}$; a: $P^m \times P^m \to P^m$ represents a second-order continuous motion strategy; M: $P^m \times P^m \to P^{m \times m}$ represents a differential map, f=Ma. When the RMP framework is applied to robot dynamics, a can be considered as the desired acceleration, M as the desired inertia matrix, and f as the desired force.

Therefore, when the robot control device 10 obtains the target obstacles that each of the multiple key obstacle-avoidance parts of the target robot needs to avoid in the current control cycle, it can decompose the robot's motion task into multiple motion strategies within different-dimensional Riemannian spaces, such as the robot joint space and robot task space, according to the RMP framework. The global motion strategy in the robot joint space, after decomposition, can directly serve as the root node of the RMP task mapping tree, while the local motion strategies in the robot task space, after decomposition, can directly serve as the leaf nodes of the RMP task mapping tree. At this point, the root node task of the RMP task mapping tree essentially represents the global motion task (i.e., the global motion strategy) for the target robot to achieve the desired effect of the robot motion task in the robot joint space. The leaf node tasks of the RMP task mapping tree represent the local motion tasks (i.e., local motion strategies) of the target robot, which are branch sub-tasks of the robot motion task in the robot task space.

Thus, the robot control device 10 can decompose the "driving the target robot to perform the desired task while ensuring that the multiple key obstacle-avoidance parts of the target robot avoid the corresponding target obstacles in the target operating environment" which serves as the robot motion task. This decomposition results in an RMP task mapping tree, which includes a root node task "global motion task in the robot joint space," leaf node tasks such as "joint limit avoidance task in the robot joint space robot," "position motion task for the first end-effector reference point performing the desired task in the robot task space," "position motion task for the second end-effector reference point performing the desired task in the robot task space," "position motion task for the center point of the robotic end effector performing the desired task in the robot task space," "obstacle avoidance motion task for the center point of the robotic end effector avoiding matching target obstacles in the robot task space," and "obstacle avoidance motion task for each key obstacle-avoidance part, other than the center point of the robotic end effector, avoiding the matching target obstacles in the robot task space."

In one embodiment, the robot control device 10 may directly use the above-mentioned root node task as the parent node of each leaf node task, and construct the RMP task mapping tree by using the spatial transformation relationship between the robot joint space corresponding to the root node task and the robot task space or robot joint space corresponding to each leaf node task as the connecting edges between the root node and its corresponding leaf nodes.

FIG. 6 is an exemplary flowchart of the sub-steps included in step S230 in FIG. 3. In another embodiment, to ensure that the local motion strategies involved in the RMP task mapping tree constructed in the present disclosure can be easily transplanted to another robot for use, a stem node that acts as a connector can be introduced between the root node and each leaf node. This stem node is only related to the robot kinematic model and does not require the active addition of a motion strategy, thereby decoupling the local motion strategy corresponding to the leaf nodes from the target robot. As a result, after establishing a leaf node, the local motion strategy corresponding to this leaf node can be easily transplanted to another robot by simply replacing the stem node task connected to it. At this point, step S230 can include steps S231 to S235 to construct an RMP task mapping tree with strong motion strategy portability, involving desired tasks, target operating environment conditions, and obstacle avoidance movements.

Step S231: Decompose a global motion task of the target robot in a robot joint space to obtain position change tasks of the center point of the robotic end effector, the first end-effector reference point, the second end-effector reference point, and the target obstacle-avoidance parts in the robot operational space, as well as the robotic joint limit avoidance task in the robot joint space.

In one embodiment, $((q, \dot{q}), [f_r, M_r]^C)$ represents the global motion task of the target robot in the robot joint space C, where $(q, \dot{q})$ represents the state parameters (e.g., joint position, joint speed, etc.) involved in the global motion task, and $[f_r, M_r]^C$ represents the RMP mathematical natural form corresponding to the global motion task, and $C \subset R^m$;

$$\left( (x_1', \dot{x}_1'), \left[ f_{S_1^g}, M_{S_1^g} \right]^{W_1} \right)$$

represents the position change task of the first end-effector reference point in the robot operation space $W_1$, $$(x_1', \dot{x}_1')$$

represents the state parameters (e.g., end position information, position change speed information, etc.) involved in the position change task, $$\left[ f_{S_1^g}, M_{S_1^g} \right]^{W_1}$$

represents the RMP mathematical natural form corresponding to the position change task, and $W_1 \subset SO(3)$;

$$\left( (x_2', \dot{x}_2'), \left[ f_{S_2^g}, M_{S_2^g} \right]^{W_2} \right)$$

represents the position change task of the second end-effector reference point in the robot operation space $W_2$, where $$(x_2', \dot{x}_2')$$

represents the state parameters (e.g., end position information, position change speed information, etc.) involved in the position change task, $$\left[ f_{S_2^g}, M_{S_2^g} \right]^{W_2}$$

represents the RMP mathematical natural form corresponding to the position change task, and $W_2 \subset SO(3)$;

$$\left( (x_0, \dot{x}_0), \left[ f_{S_0^g}, M_{S_0^g} \right]^{X_0} \right)$$

represents the position change task of the center point of the robotic end effector in the robot operation space $X_0$, $(x_0, \dot{x}_0)$ represents the state parameters (e.g., end position information, position change speed information, etc.) involved in the position change task, $$\left[ f_{S_0^g}, M_{S_0^g} \right]^{X_0}$$

represents the RMP mathematical natural form corresponding to the position change task, and $X_0 \subset R^3$;

$$\left\{ \left( (x_i, \dot{x}_i), \left[ f_{S_i^g}, M_{S_i^g} \right]^{x_i} \right) \right\}_{i=1}^{t}$$

represents the position change task of each of the t target obstacle-avoidance parts except the center point of the robotic end effector in the corresponding robot operation space $x_i | (i=1, \ldots, t)$, $(x_i, \dot{x}_i) | (i=1, \ldots, t)$ represents the state parameters (e.g., obstacle-avoidance position information, obstacle-avoidance position change speed, etc.) involved in the position change task of the i-th target obstacle-avoidance part, $$\left[ f_{S_i^g}, M_{S_i^g} \right]^{x_i} \Big| (i = 1, \ldots, t)$$

represents the RMP mathematical natural form corresponding to the position change task of the i-th target obstacle-avoidance part, and $x_i \subset R^3 | (i=1, \ldots, t)$; $((q, \dot{q}), [f_l, M_l]^C)$ represents the robotic joint limit avoidance task of the target robot in the robot joint space C, $(q, \dot{q})$ represents the state parameters (e.g., joint position, joint speed, etc.) involved in the robotic joint limit avoidance task, and $[f_l, M_l]^C$ represents the RMP mathematical natural form corresponding to the robotic joint limit avoidance task. At this point, the aforementioned global motion task can be regarded as the common parent node of the aforementioned robot joint limit avoidance task and all position change tasks.

Step S232: For each end-effector reference point of the first end-effector reference point and the second end-effector reference point, decompose the position change task of the end-effector reference point into a task space of the reference point to obtain the position motion task of the end-effector reference point in the corresponding task space for executing the desired operation.

In one embodiment, $$\left( (x_1', \dot{x}_1'), \left[ f_{g_1}, M_{g_1} \right]^{R_1} \right)$$

represents the position motion task of the first end-effector reference point in the task space $R_1$, where $[f_{g_1}, M_{g_1}]^{R_1}$ represents the RMP mathematical natural form corresponding to the position motion task, $R_1 \subset SO(3)$. At this point, the position change task of the first end-effector reference point can be regarded as the parent node of the position motion task of the first end-effector reference point.

$$\left( (x_2', \dot{x}_2'), \left[ f_{g_2}, M_{g_2} \right]^{R_2} \right)$$

represents the position motion task of the second end-effector reference point in the task space $R_2$, where $[f_{g_2}, M_{g_2}]^{R_2}$ represents the RMP mathematical natural form corresponding to the position motion task, and $R_2 \subset S0(3)$. At this point, the position change task of the second end-effector reference point can be regarded as the parent node of the position motion task of the second end-effector reference point.

Step S233: For the center point of the robotic end effector, based on the actual voxel block positions or envelope motion information of all of the target obstacles corresponding to the center point of the robotic end-effector, decompose the position change task of the center point of the robotic end effector into a task space of the center point of the robotic end effector to obtain the position motion task for executing the desired operation in the corresponding task space, as well as the obstacle-avoidance motion tasks for each of the target obstacles that needs to be avoided in the corresponding task space of the center point of the robotic end-effector.

The position change task of the center point of the robotic end effector in the robot operation space $X_0$ can be decomposed into the task space $R_0$ with the same dimension as the robot operation space $X_0$, and the position motion task of the center point of the robotic end effector in the task space $R_0$ for performing the desired operation can be obtained. At this point, the position motion task can be represented by $((x_0, \dot{x}_0), [f_{g_0}, M_{g_0}]^{R_0})$, where $[f_{g_0}, M_{g_0}]^{R_0}$ represents the RMP mathematical natural form corresponding to the position motion task, $R_0 \subset R^3$. The position change task of the center point of the robotic end effector can be regarded as the parent node of the position motion task of the center point of the robotic end effector.

Additionally, the position change task of the center point of the robotic end effector in the robot operation space $X_0$ can be decomposed into the one-dimensional manifold task space $D_j | (j=0, \ldots, k)$ corresponding to each target obstacle, which describes the change of the relative distances between the center point of the robotic end effector and the corresponding target obstacles, and the obstacle avoidance motion task of the center point of the robotic end effector for avoiding the jth target obstacle in the task space $D_j | (j=0, \ldots, k)$ is obtained. At this point, the obstacle avoidance motion task of the center point of the robotic end effector for avoiding the target obstacle in the task space $D_j | (j=0, \ldots, k)$ corresponding to the jth target obstacle can be represented by $$\left( (d_0^j, \dot{d}_0^j), \left[ f_{\alpha_0^j}, M_{\alpha_0^j} \right]^{D_j} \right), \text{ where } (d_0^j, \dot{d}_0^j)$$

represents the state parameters involved in the obstacle avoidance motion task (e.g., the relative distance between the center point of the robotic end effector and the jth target obstacle, the relative motion speed between the center point of the robotic end effector and the jth target obstacle, etc.), $$\left[ f_{\alpha_0^j}, M_{\alpha_0^j} \right]^{D_j}$$

represents the RMP mathematical natural form corresponding to the obstacle avoidance motion task, and k represents the total number of target obstacles matched by the center point of the robotic end effector in the target operating environment. At this point, the position change task of the center point of the robotic end effector can be regarded as the parent node of the obstacle avoidance motion task, and the relative distance and relative motion speed between the center point of the robotic end effector and the jth target obstacle can be obtained based on the actual voxel block position or envelope motion information of the jth target obstacle.

Step S234: For each of the target obstacle-avoidance parts, based on the actual voxel block positions or envelope motion information of all of the target obstacles corresponding to the target obstacle-avoidance part, decompose the position change task of the target obstacle-avoidance part into the task space of the target obstacle-avoidance part to obtain the obstacle-avoidance motion tasks for each of the target obstacles that need to be avoided in the corresponding task space of the target obstacle-avoidance part.

For each target obstacle-avoidance part, the position change task of the target obstacle-avoidance part in the corresponding robot operation space $x_i | (i=1, \ldots, t)$ can be decomposed into the one-dimensional manifold task space $D_j | (j=0, \ldots, m/n)$ corresponding to each target obstacle, and the obstacle avoidance motion task of the i-th $(i=1, \ldots, t)$ target obstacle-avoidance part to avoid the j-th target obstacle in the one-dimensional manifold task space $D_j | (j=0, \ldots, m/n)$. At this point, the obstacle avoidance motion task of the i-th target obstacle-avoidance part to avoid the target obstacle in the task space $D_j | (j=0, \ldots, m/n)$ corresponding to the j-th target obstacle can be represented by $$\left( (d_i^j, \dot{d}_i^j), \left[ f_{\alpha_i^j}, M_{\alpha_i^j} \right]^{D_j} \right), \text{ where } (d_i^j, \dot{d}_i^j)$$

represents the state parameters involved in the obstacle avoidance motion task (e.g., the relative distance between the i-th target obstacle-avoidance part and the j-th target obstacle, the relative movement speed between the i-th target obstacle-avoidance part and the j-th target obstacle, etc.), $$\left[ f_{\alpha_i^j}, M_{\alpha_i^j} \right]^{D_j}$$

represents the RMP mathematical natural form corresponding to the obstacle avoidance motion task, and n/n represents the total number of target obstacles matched by different target obstacle-avoidance parts in the target operating environment. At this point, the position change task corresponding to the i-th target obstacle-avoidance part can be regarded as the parent node of each obstacle avoidance motion task related to the i-th target obstacle-avoidance part, and the relative distance and relative movement speed between the i-th target obstacle-avoidance part and the j-th target obstacle can be obtained based on the actual voxel block position or envelope motion information of the j-th target obstacle.

It can be understood that, for the i-th key obstacle-avoidance part among the multiple key obstacle avoidance-parts including the center point of the robotic end effector, if the j-th target obstacle matching the i-th key obstacle-avoidance part is a static environment obstacle, then according to the actual voxel block position of the j-th target obstacle, the state parameters (including relative distance and relative movement speed) in the obstacle avoidance motion task corresponding to the i-th key obstacle-avoidance part and the j-th target obstacle can be calculated using the following equations:

$$\begin{cases} d_i^j = \left[ \operatorname{diag}\left( \max\left( \operatorname{sgn}\left(p_i^j\right),\, 0\right)\right)\right] p_i^j \\ c_i^j = \left(R_i^j\right)^T \left(x_i^a - t_i^j\right) \\ p_i^j = \left[ \operatorname{diag}\left( \operatorname{sgn}\left(c_i^j\right)\right)\right] c_i^j - \frac{1}{2} l_i^j \\ d_i^j = \left\| d_i^j \right\| \\ \dot{d}_i^j = \frac{\left(d_i^j\right)^T}{d_i^j} \left[ \operatorname{diag}\left( \max\left( \operatorname{sgn}\left(p_i^j\right),\, 0\right)\right)\right] \left[ \operatorname{diag}\left( \operatorname{sgn}\left(c_i^j\right)\right)\right] \left(R_i^j\right)^T \dot{x}_i^a \end{cases},$$

where $$d_i^j$$

represents the relative distance between the i-th target obstacle-avoidance part and the j-th target obstacle, $$\dot{d}_i^j$$

represents the relative speed between the i-th target obstacle-avoidance part and the j-th target obstacle, $\|\bullet\|$ represents vector modulus operation, $$t_i^j$$

represents the actual voxel block position of the jth target obstacle in the i-th target obstacle-avoidance part, $$l_i^j$$

represents the actual voxel block size of the jth target obstacle of the i-th target obstacle-avoidance part, $$R_i^j$$

represents the unit rotation matrix of the jth target obstacle of the i-th target obstacle-avoidance part, sgn(v) represents performing a sign operation on each element of the vector v, max(v, 0) represents comparing each element of the vector v with 0 and taking the larger value, diag(v) represents transforming the vector into a diagonal matrix with the same dimension, where the diagonal elements correspond to the elements of the vector v, $$x_i^a$$

represents the actual spatial position of the i-th target obstacle-avoidance part, and $$\dot{x}_i^a$$

represents the actual moving speed of the i-th target obstacle-avoidance part.

If the jth target obstacle matching the i-th key obstacle-avoidance part is a dynamic object obstacle, then the state parameters (including relative distance and relative motion speed) in the obstacle avoidance motion task corresponding to the i-th key obstacle-avoidance part and the j-th target obstacle can be calculated according to the envelope motion information of the j-th target obstacle using the following equations:

$$\begin{cases} d_i^j = \left\| x_i^a - o_i^j \right\| - r_i^j \\ \dot{d}_i^j = \frac{\left(x_i^a - o_i^j\right)^T}{d_i^j} \left(\dot{x}_i^a - \dot{o}_i^j\right) \end{cases},$$

where $$d_i^j$$

represents the relative distance between the i-th target obstacle-avoidance part and the j-th target obstacle, $$\dot{d}_i^j$$

represents the relative movement speed between the i-th target obstacle-avoidance part and the j-th target obstacle, $\|\bullet\|$ represents the vector modulus operation, $$o_i^j$$

represents the envelope sphere center position of the jth target obstacle corresponding to the i-th target obstacle-avoidance part, $$r_i^j$$

represents the envelope radius of the jth target obstacle corresponding to the i-th target obstacle-avoidance part, $$\dot{o}_i^j$$

represents the moving speed of the envelope sphere center of the jth target obstacle corresponding to the i-th target obstacle-avoidance part, $$x_i^a$$

represents the actual spatial position of the i-th target obstacle-avoidance part, and $$\dot{x}_i^a$$

represents the actual moving speed of the i-th target obstacle avoidance part.

Step S235: Based on a spatial transformation relationship between the robot joint space, robot operational space, and task space, construct a tree structure for the global motion task, the robotic joint limit avoidance task, all of the position change tasks, all of the position motion tasks, and all of the obstacle-avoidance motion tasks to obtain the RMP task mapping tree.

In one embodiment, spatial transformation relationship between the robot joint space, the robot operation space and the task space may include the spatial transformation relationship between the robot joint space C and the robot operation space $W_1$, $W_2$, $X_0$ and $x_i|(i=1, \ldots, t)$, the spatial transformation relationship between the robot operation space $W_1$ and the task space $R_1$, the spatial transformation relationship between the robot operation space $W_2$ and the task space $R_2$, the spatial transformation relationship between the robot operation space $X_0$ and the task space $R_0$, the spatial transformation relationship between the robot operation space $X_0$ and the task space $D_j|(j=0, \ldots, k)$, and the spatial transformation relationship between the robot operation space $x_i|(i=1, \ldots, t)$ and the task space $D_j|(j=0, \ldots, m/n)$.

Figure 7:
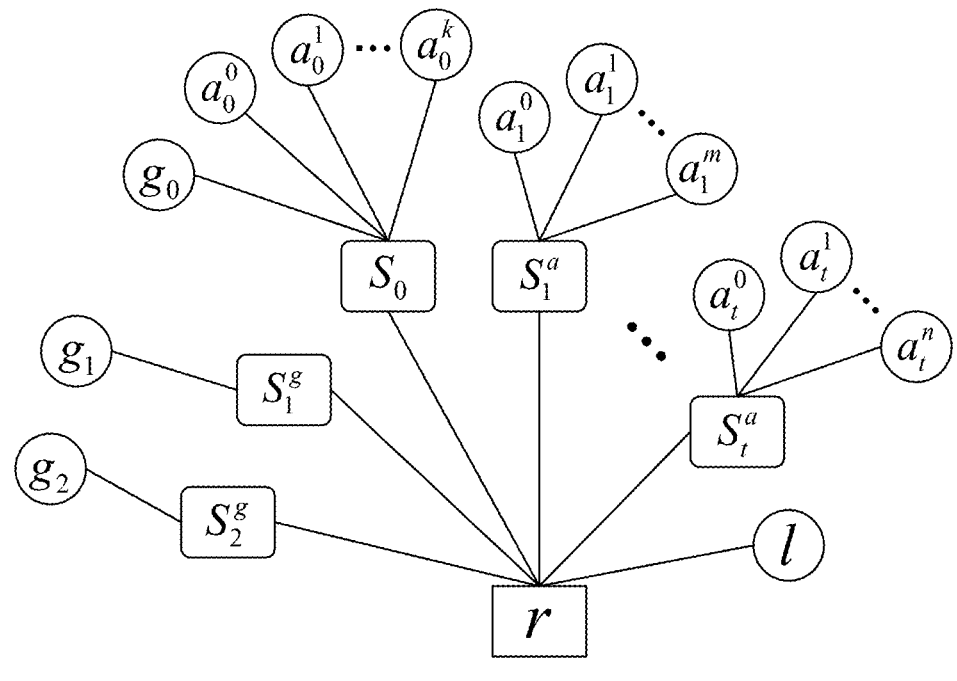
FIG. 7 is a schematic diagram of a tree structure of a Riemannian Motion Policies (RMP) task mapping tree according to one embodiment.

Taking the diagram of the tree structure of the RMP task mapping tree shown in FIG. 7 as an example, the global motion task can be used as the root node r; the position change task of the first end-effector reference point can be used as the stem node $$S_1^g$$

(i.e., the child node of the root node r); the position change task of the second end-effector reference point can be used as the stem node $$S_2^g;$$

the position change task of the center point of the robotic end effector can be used as the stem node $S_0$; the position change tasks of each target obstacle-avoidance part other than the robotic end effector can be used as stem nodes $$S_i^a|(i=1, \ldots, t)$$

respectively; the position motion task of the first end-effector reference point can be used as the leaf node $g_1$ of the stem node $$S_1^g,$$

that is, the child node of the stem node $$S_1^g;$$

the position motion task of the second end reference point can be used as the leaf node $g_2$ of the stem node $$S_2^g;$$

the position motion task of the center point of the robotic end effector can be used the leaf node $g_0$ of the stem node $S_0$; the obstacle avoidance movement task of the center point of the robotic end effector corresponding to the jth (j=0, ..., k)th target obstacle can be used as the leaf node $$a_0^i$$

of the stem node $S_0$; the obstacle avoidance movement task corresponding to the jth j=0, ..., m/n)th target obstacle of the i-th target obstacle-avoidance part other than the center point of the robotic end effector can be used as the leaf node $$a_i^j$$

of the stem node $$S_i^a|(i=1, \ldots, t)$$

corresponding to the i-th target obstacle-avoidance part; and the robotic joint limit avoidance task can be used as the leaf node l of the root node r.

Step S240: Perform global joint acceleration solving based on the RMP task mapping tree to obtain desired joint accelerations of the target robot in the current control cycle according to actual joint state information and desired end-effector posture information of the target robot in the current control cycle that matches the expected operation.

In one embodiment, after the end effector desired pose information of the robotic end effector of the target robot in the current control cycle is decomposed into the desired position information corresponding to the center point of the robotic end effector, the first end-effector reference point and the second end-effector reference point respectively, based on the obtained actual joint state information and the desired position information, global joint acceleration solving can be performed for the RMP task mapping tree using RMP forward propagation and RMP backward propagation operations, to obtain the desired joint accelerations of the target robot in the current control cycle, which are adapted to the above global motion task.

FIG. 8 is an exemplary flowchart of the sub-steps included in step S240 of FIG. 3. In this embodiment, step S240 can include steps S241 to S243, in order to utilize the fast iterative solving characteristics of the RMP motion strategy, ensuring that the target robot achieves reactive obstacle avoidance for various obstacles affecting its task execution during the desired operation, thus improving the robot's obstacle avoidance real-time performance. Additionally, by introducing a geometric dynamical system (GDS) that involves velocity information for local motion strategy calculation, and leveraging the velocity continuity characteristics of the geometric dynamical system, the robot's obstacle avoidance agility is enhanced. This ensures that the robot can perform high agility and high real-time reactive obstacle avoidance for various obstacles that affect its task execution, and that the corresponding obstacle avoidance effect is effectively adapted to the actual environmental conditions of the robot's operating environment.

Step S241: Construct geometric dynamic systems for all of the position motion tasks, each involving end-effector position information and position change velocity information, and construct geometric dynamic systems for all of the obstacle-avoidance motion tasks, each involving relative distance information and relative motion velocity information between key obstacle-avoidance parts and target obstacles, as well as geometric dynamic system for the robot joint limit avoidance task, which involves joint position information and joint velocity information.

The geometric dynamic system can be regarded as a virtual mechanical system defined on the manifold space. The system inertia is determined by the configuration and speed of the mechanical body. A single geometric dynamic system can be represented by a mathematical tuple (M, G, B, $\Phi$), where M represents the manifold space (e.g., task space $R_0$, task space $R_1$, task space $R_2$, and task space $D_j|(j=0, \ldots, k/m/n)$) where the corresponding geometric dynamic system is located. At this point, the geometric dynamic system needs to satisfy the following conditions:

$$\begin{cases} (G(x, \dot{x}) + \Xi_G(x, \dot{x}))\ddot{x} + \xi_G(x, \dot{x}) = -\nabla_x \Phi(x) - B(x, \dot{x})\dot{x} \\ \Xi_G(x, \dot{x}) = \frac{1}{2}\sum_{i=1}^{m} \dot{x}_i \partial_{\dot{x}} g_i(x, \dot{x}) \\ \xi_G(x, \dot{x}) = \overset{x}{G}(x, \dot{x})\dot{x} - \frac{1}{2}\nabla_x \left(\dot{x}^T G(x, \dot{x})\dot{x}\right) \\ \overset{x}{G}(x, \dot{x}) = [\partial_x g_i(x, \dot{x})\dot{x}]_{i=1}^{m} \end{cases},$$

where G(x, $\dot{x}$) represents the geometric metric matrix corresponding to the system state parameter (x, $\dot{x}$) of the corresponding geometric dynamic system, B(x, $\dot{x}$) represents the damping matrix corresponding to the system state parameter (x, $\dot{x}$) of the corresponding geometric dynamic system, $\Phi$(x) represents the potential energy equation of the corresponding geometric dynamic system, $\xi_G$(x, $\dot{x}$) represents the first curvature term matrix corresponding to the system state parameter (x, $\dot{x}$) of the corresponding geometric dynamic system, $\xi_G$(x, $\dot{x}$) represents the second curvature term matrix corresponding to the system state parameter (x, $\dot{x}$) of the corresponding geometric dynamic system, $g_i$(x, $\dot{x}$) represents the submatrix of the ith column in G(x, $\dot{x}$), $\partial_x$ represents the partial derivative of the state parameter x, $\partial_{\dot{x}}$ represents the partial derivative of the state parameter $\dot{x}$, $\nabla_x$ represent the gradient of the state parameter x, m represents the total number of columns of matrix G(x, $\dot{x}$), the state parameter $\dot{x}$ is the differential of state parameter x, and $\ddot{x}$ is the differential of state parameter $\dot{x}$.

In this case, the state parameters x and $\dot{x}$ corresponding to the position motion task represent the position information and position change speed information of any one of the center point of the robotic end effector, the first end-effector reference point and the second end-effector reference point. The state parameter x and the state parameter $\dot{x}$ corresponding to the obstacle avoidance motion task represent the relative distance information and relative motion speed information between the key obstacle-avoidance parts including the center point of the robotic end effector and the corresponding target obstacles. The state parameter x and the state parameter $\dot{x}$ corresponding to the robotic joint limit avoidance task represent the joint position information and the joint speed information.

It can be understood that the geometric dynamic systems corresponding to the aforementioned position motion task, robot joint limit avoidance task, and various obstacle avoidance motion tasks can be designed according to the robot's motion requirements (e.g., maintaining balance, maintaining a good configuration, smoothly avoiding obstacle collisions, smoothly reaching the desired position, smoothly reaching the desired pose, abrupt reaching of the desired position, abrupt reaching of the desired pose, sudden stopping to avoid obstacle collisions, etc.). The specific design approach of the geometric dynamic system in the present disclosure is not restricted.

In one embodiment, based on the robot motion requirement of smoothly avoiding obstacles, the geometric dynamic system corresponding to the obstacle avoidance motion task of the i-th (i=0, . . . , t) key obstacle-avoidance part for the j-th (j=0, . . . , k/m/n) target obstacle is designed as $$GDS\left(D_j, G_{\alpha_i^j}, B_{\alpha_i^j}, \Phi_{\alpha_i^j}\right),$$

where $D_j$ represents that the manifold space where the obstacle avoidance motion task is located is the task space where the leaf node $$a_i^j$$

is located. In one embodiment, the calculation equations for $$G_{\alpha_i^j}, B_{\alpha_i^j} \text{ and } \Phi_{\alpha_i^j}$$

are as follows:

$$\begin{cases} G_{\alpha_i^j} = w\left(d_i^j\right) \times u\left(\dot{d}_i^j\right), B_{\alpha_i^j} = r_d G_{\alpha_i^j} \\ \nabla_{\alpha_i^j} \Phi_{\alpha_i^j} = r_p \times w\left(d_i^j\right) \times \nabla_{\alpha_i^j} w\left(d_i^j\right) \\ w\left(d_i^j\right) = \frac{\max\left(d_u - d_i^j, 0\right)}{\max\left(d_i^j - d_l, \varepsilon\right)} \\ u\left(\dot{d}_i^j\right) = \begin{cases} 1 - \exp\left(\frac{-\left(\dot{d}_i^j\right)^2}{\left(2\sigma^2\right)}\right) & \dot{d}_i^j < 0 \\ 0 & \dot{d}_i^j \geq 0 \end{cases} \end{cases},$$

where $$G_{\alpha_i^j}$$

represents the geometric metric matrix of the geometric dynamic system $$GDS\left(D_j, G_{\alpha_i^j}, B_{\alpha_i^j}, \Phi_{\alpha_i^j}\right), B_{\alpha_i^j}$$

represents the geometric damping matrix of the geometric dynamic system $$GDS\left(D_j, G_{\alpha_i^j}, B_{\alpha_i^j}, \Phi_{\alpha_i^j}\right), \Phi_{\alpha_i^j}$$

represents the potential energy equation of the geometric dynamic system $$DS\left(D_j, G_{\alpha_i^j}, B_{\alpha_i^j}, \Phi_{\alpha_i^j}\right), d_i^j$$

represents the relative distance between the i-th target obstacle-avoidance part and the j-th target obstacle, $$\dot{d}_i^j$$

represents the relative motion speed between the i-th target obstacle-avoidance part and the j-th target obstacle, $$\nabla_{d_i^j}$$

represents the gradient of the state parameter $$d_i^j, d_u$$

represents the obstacle avoidance start distance corresponding to the obstacle avoidance start range in FIG. 1, $d_l$ represents the shortest safe distance corresponding to the obstacle avoidance prohibited range in FIG. 1, $r_p$ represents the proportional gain, $r_d$ represents the speed gain, $\sigma$ represents the scale parameter, and $\varepsilon$ is a small positive number.

Step S242: Based on an RMP forward propagation operation, transmit the actual joint state information and the desired end-effector posture information from a root node of the RMP task mapping tree to each of the leaf node tasks, such that each leaf node task can solve for a desired inertia matrix and desired forces based on a corresponding geometric dynamic system to obtain a local desired inertia matrix and local desired forces for each of the leaf node tasks.

For the RMP framework, the RMP forward propagation operation essentially refers to the forward transmission of state information from the parent node to the child nodes. When there is a parent node $u=((x, \dot{x}), [f, M]^{\mathcal{M}})$ and K child nodes $$\left\{v_i = \left((y_i, \dot{y}_i), [f_i, M_i]^{N_i}\right)\right\}_{i=1}^K,$$

where there exists a spatial transformation relationship $N_i=\psi_{e_i}(M)$ between the parent node and the i-th child node, the aforementioned RMP forward propagation operation can be expressed as: $(y_i, \dot{y}_i)=\text{pushforward}(x, \dot{x})=(\psi_{e_i}(x), J_i(x)\dot{x})$, where $J_i=\partial_x\psi_{e_i}$, $\partial_x$ represents the partial derivative of the state parameter x.

Thus, the robot control device 10 can use the spatial transformation relationships between the root node and the various leaf nodes disclosed in the RMP task mapping tree (including the spatial transformation relationships between the root node and each stem node, the spatial transformation relationships between each stem node and its corresponding at least one leaf node, and the spatial transformation relationships between the root node and the directly connected leaf nodes), and, through the RMP forward propagation operation, transmit the actual joint state information and the end-effector desired pose information to the geometric dynamical system of each leaf node. Then, for each leaf node's geometric dynamical system, the desired inertia matrix and desired force are computed, resulting in the local desired inertia matrix and local desired force needed for the leaf node to complete its corresponding branch subtask under the influence of the actual joint state information and the end-effector desired pose information.

In one embodiment, the calculation equations for the local desired inertia matrix and the local desired force corresponding to each geometric dynamical system are expressed as follows:

$$\begin{cases} M(x, \dot{x}) = G(x, \dot{x}) + \Xi_G(x, \dot{x}) \\ f(x, \dot{x}) = M(x, \dot{x})\ddot{x} = -\nabla_x\Phi(x) - B(x, \dot{x})\dot{x} - \xi_G(x, \dot{x}) \end{cases},$$

where $M(x, \dot{x})$ represents the local desired inertia matrix corresponding to the system state parameter $(x, \dot{x})$ of the corresponding geometric dynamical system, and $f(x, \dot{x})$ represents the local desired force corresponding to the system state parameter $(x, \dot{x})$ of the corresponding geometric dynamical system.

Thus, the local desired inertia matrix and local desired force for each leaf node task in the RMP task mapping tree can be accurately calculated using the above equations.

In one embodiment, when the geometric dynamic system corresponding to the obstacle avoidance motion task of the i-th (i=0, . . . , t) key obstacle-avoidance part for the j-th (j=0, . . . , k/m/n) target obstacle is designed as the above $$GDS\left(D_j, G_{\alpha_i^j}, B_{\alpha_i^j}, \Phi_{\alpha_i^j}\right),$$

the actual calculation equations of the local desired inertia matrix $$M_{\alpha_i^j}$$

and the local desired force $$f_{\alpha_i^j}$$

corresponding to the obstacle avoidance motion task are as follows:

$$
\begin{cases}
M_{a_i^j} = G_{a_i^j} + \frac{1}{2}\dot{d}_i^j w(d_i^j) \times \nabla_{\dot{d}_i^j} u(\dot{d}_i^j) \\
\xi_{G_{a_i^j}} = \frac{1}{2}(\dot{d}_i^j)^2 u(\dot{d}_i^j) \times \nabla_{\dot{d}_i^j} w(d_i^j) \\
f_{a_i^j} = -\nabla_{d_i^j} \Phi_{a_i^j} - B_{a_i^j}\dot{d}_i^j - \xi_{G_{a_i^j}}
\end{cases},
$$

where $$
\nabla_{\dot{d}_i^j}
$$

represents the gradient of the state parameter $$
\dot{d}_i^j.
$$

Step S243: Based on an RMP backward propagation operation, transmit reversely local desired inertia matrices and local desired forces of each of the leaf node tasks to the root node for joint acceleration calculation, thereby obtaining the desired joint accelerations of the target robot in the current control cycle.

For the RMP framework, the RMP backward propagation operation is essentially a reverse transmission operation of the RMP information flow from the child nodes to the parent node. When there is a parent node $u=((x, \dot{x}), [f, M]^M)$ and K child nodes $$
\{v_i = ((y_i, \dot{y}_i), [f_i, M_i]^{N_i})\}_{i=1}^K
$$

under the parent node, where there is a spatial transformation relationship $N_i=\psi_{e_i}(M)$ between the parent node and the i-th child node, $J_i=\partial_x\psi_{e_i}$, the aforementioned RMP backward propagation operation can be expressed as:

$$
\begin{cases}
f = \sum_{i=1}^K J_i^T(f_i - M_i\dot{J}_i\dot{x}) \\
M = \sum_{i=1}^K J_i^T M_i J_i
\end{cases},
$$

where $\dot{J}_i$ represents the differential of $J_i$.

Thus, the robot control device 10 can, based on the spatial transformation relationships between the root node and each leaf node revealed by the RMP task mapping tree, use the RMP backward propagation operation to transmit the local desired inertia matrices and local desired forces of the leaf node tasks to the root node. This allows the global desired inertia matrix and global desired force to be obtained at the root node, representing the desired task effects of simultaneously achieving each of the leaf node tasks in the robot joint space. Then, based on the obtained global desired inertia matrix and global desired force, joint acceleration solving is performed for the root node to obtain the desired joint accelerations corresponding to the desired effect of the global motion strategy for the robot motion task.

After the robot control device 10 obtains the global desired inertia matrix and global desired force corresponding to the root node, it can calculate the desired joint accelerations for the target robot in the current control cycle, corresponding to the global motion strategy, based on the conversion relationship between the RMP canonical form and the RMP natural form, using the following equation: $a=M^+f$, where $M^+=(M^TM)^{-1}M^T$, a represents the desired joint acceleration, $M^+$ represents the pseudoinverse matrix of the global desired inertia matrix M, and f represents the global desired force.

By performing the above steps S241 to S243, the rapid iterative solving characteristic of the RMP motion strategy is utilized to ensure that the target robot can implement reactive obstacle avoidance for various obstacles affecting the robot's task during execution. This improves the real-time obstacle avoidance performance of the robot. Additionally, by introducing a geometric dynamical system involving velocity information for local motion strategy computation, and utilizing the velocity continuity characteristics of the geometric dynamical system, the robot's obstacle avoidance agility is enhanced. This ensures that during task execution, the robot can perform highly agile and real-time reactive obstacle avoidance for obstacles that affect its tasks, and ensures that the obstacle avoidance effect is effectively adapted to the actual environmental conditions of the robot's operating environment.

Step S250: Control the target robot to move according to the desired joint accelerations.

After the robot control device 10 obtains the desired joint accelerations of the target robot in the current control cycle that matches the global motion strategy, it can calculate the desired joint state information of the target robot (including the desired joint positions and desired joint accelerations of the target robot in the current control cycle) based on the actual joint state information of the target robot and the desired joint accelerations in the current control cycle. Then, the actual joint state information of the target robot in the robot joint space is controlled according to the obtained desired joint state information, ensuring that the target robot can achieve highly agile and real-time reactive obstacle avoidance for various obstacles that affect its tasks during the execution of the desired tasks in the operating environment.

By executing the above steps S210 to S250, different perception approaches are employed for static environmental obstacles and dynamic object obstacles in the robot's operating environment, avoiding the repeated execution of time-consuming point cloud processing tasks for static environmental obstacles and enabling real-time monitoring of dynamic object obstacle movement. This improves the robot's obstacle avoidance real-time performance. The robot's movement interference caused by various obstacles during task execution is deeply considered. The RMP framework is used to control the robot's reactive obstacle avoidance with high agility and real-time performance in response to various obstacles that impact the robot's tasks during operation, ensuring that the obstacle avoidance effect is effectively adapted to the actual environmental conditions of the robot's operating environment.

FIG. 9 is a flowchart of an obstacle avoidance control method according to another embodiment. Compared to the robot obstacle avoidance control method shown in FIG. 3, the method shown in FIG. 9 further includes steps S260 to S290. These steps involve using the depth camera perception system to perform a one-time measurement of voxel block information for each static environmental obstacle in the robot's operating environment. The information is then stored for later use, avoiding the need for repeated time-consuming point cloud processing of static environmental obstacles during task execution. This approach enhances the speed of obstacle perception information processing in the robot's operating environment and ensures the real-time performance of robot obstacle avoidance.

Step S260: In response to there being no movable obstacles in the target operating environment, control a number of depth cameras included in the depth camera perception system to respectively capture a number of environmental depth images of the target operating environment.

Step S270: Extract corresponding raw point cloud data from the environmental depth images, and sequentially perform point cloud denoising, point cloud registration, and point cloud removal processing for the target robot on the extracted raw point cloud data, to obtain the environmental point cloud data corresponding to the target operating environment.

In one embodiment, a passthrough filter can be used to remove point clouds outside the specified range of the camera coordinate system from the raw point cloud data, while an outlier filter can be applied to eliminate statistical noise from the raw point cloud data, achieving a denoising effect for the point cloud data. Based on the homogeneous transformation matrix of the camera coordinate system relative to the robot base coordinate system, the denoised point cloud data is converted into the robot base coordinate system. Using the reference points set on the target robot, point cloud data from different depth cameras is mapped into the robot base coordinate system and registered to form a full-view point cloud. Then, the target point cloud data representing the target robot is clustered, and the target point cloud data is removed from the stitched full-view point cloud, resulting in a complete environmental point cloud data. Using the reference points set on the target robot, point cloud data from different depth cameras is mapped into the robot base coordinate system and registered to form a full-view point cloud. Then, the target point cloud data representing the target robot is clustered, and the target point cloud data is removed from the stitched full-view point cloud, resulting in a complete environmental point cloud data.

Step S280: Perform point cloud voxelization on the environmental point cloud data to obtain actual voxel block sizes and the actual voxel block positions of all of the environmental obstacles in the target operating environment.

In one embodiment, the octree algorithm can be used to discretize the above environmental point cloud data into voxel blocks of a specified resolution, effectively simplifying the representation of static environmental obstacles. This process results in the actual voxel block sizes and positions for each environmental obstacle.

Step S290: Store the actual voxel block positions and actual voxel block sizes of the environmental obstacles in the target operating environment.

By executing the above steps S260 to S290, the depth camera perception system can conduct a one-time measurement of the voxel block information for each static environmental obstacle in the robot's operating environment. The information is stored for future use, thereby avoiding the repetitive execution of time-consuming point cloud data processing for static environmental obstacles during the robot's operation. This improves the speed of obstacle perception information processing in the robot's environment and ensures real-time obstacle avoidance.

It should be understood that sequence numbers of the foregoing processes do not mean an execution sequence in the above-mentioned embodiments. The execution sequence of the processes should be determined according to functions and internal logic of the processes, and should not be construed as any limitation on the implementation processes of the above-mentioned embodiments.

To ensure that the robot control device 10 can effectively execute the above obstacle avoidance control method, this present disclosure implements the aforementioned functions by dividing the obstacle avoidance control device 100, stored in the robot control device 10, into functional modules. The specific components of the obstacle avoidance control device 100, applied to the robot control device 10, will be described in the following.

FIG. 10 is a schematic block diagram of the obstacle avoidance control device 100 according to one embodiment. In this embodiment, the obstacle avoidance control device 100 may include an obstacle status acquisition module 110, an obstacle avoidance determination module 120, an RMP task tree construction module 130, a global task tree solving module 140, and a motion control module 150.

The obstacle status acquisition module 110 is to obtain, by a depth camera perception system, envelope motion information of each movable obstacle in a target operating environment in a current control cycle, and access a pre-stored actual voxel block position of each environmental obstacle in the target operating environment. The actual voxel block position of each environmental obstacle was measured by the depth camera perception system before the movable obstacles were present in the target operating environment. The obstacle avoidance determination module 120 is to determine a number of target obstacles that need to be avoided by a number of key obstacle-avoidance parts of a target robot in the target operating environment according to all of the envelope motion information and all of the actual voxel block positions. The RMP task tree construction module 130 is to construct an RMP task mapping tree corresponding to a desired operation of the target robot in the target operating environment according to actual voxel block positions or envelope motion information of all of the target obstacles. The leaf node tasks of the RMP task mapping tree includes a robotic joint limit avoidance task, a pose variation task for a robotic end effector to perform the desired operation, and obstacle avoidance motion tasks for the key obstacle-avoidance parts to avoid corresponding target obstacles. The global task tree solving module 140 is to perform global joint acceleration solving based on the RMP task mapping tree to obtain desired joint accelerations of the target robot in the current control cycle according to actual joint state information and desired end-effector posture information of the target robot in the current control cycle that matches the expected operation. The motion control module 150 is to control the target robot to move according to the desired joint accelerations.

Figure 11:
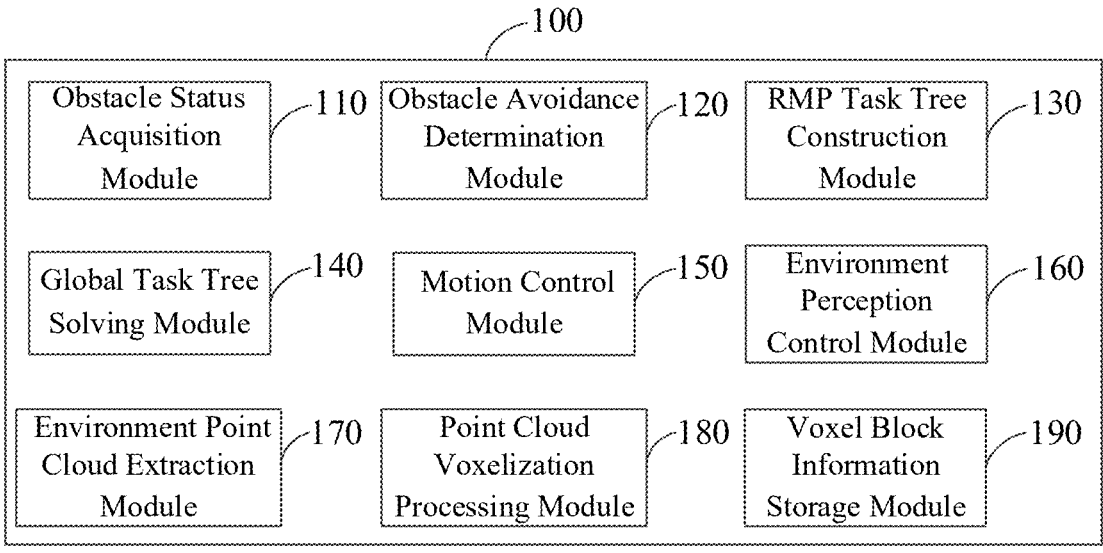
FIG. 11 is a schematic block diagram of an obstacle avoidance control device according to another embodiment.

FIG. 11 is a schematic block diagram of the obstacle avoidance control device 100 according to another embodiment. In the embodiment, the obstacle avoidance control device 100 may further include an environment perception control module 160, an environment point cloud extraction module 170, a point cloud voxelization processing module 180 and a voxel block information storage module 190.

The environment perception control module 160 is to, in response to there being no movable obstacles in the target operating environment, control a number of depth cameras included in the depth camera perception system to respectively capture a number of environmental depth images of the target operating environment. The environment point cloud extraction module 170 is to extract corresponding raw point cloud data from the environmental depth images, and sequentially perform point cloud denoising, point cloud registration, and point cloud removal processing for the target robot on the extracted raw point cloud data, to obtain the environmental point cloud data corresponding to the target operating environment. The point cloud voxelization processing module 180 is to perform point cloud voxelization on the environmental point cloud data to obtain actual voxel block sizes and the actual voxel block positions of all of the environmental obstacles in the target operating environment. The voxel block information storage module 190 is to store the actual voxel block positions and actual voxel block sizes of the environmental obstacles in the target operating environment.

It should be noted that the basic principle and technical effect of the obstacle avoidance control device 100 described above are the same as those of the aforementioned obstacle avoidance control method. For the sake of brief description, for the parts not mentioned in this embodiment, reference can be made to the description of the aforementioned obstacle avoidance control method.

It should be noted the obstacle avoidance control device 100 can be divided into functional modules according to the various process embodiments of the above-mentioned obstacle avoidance control method. For example, the functions of each step can be divided into individual functional modules, or two or more step functions can be integrated into one processing module. The integrated processing modules can be implemented either in hardware form or as software functional modules. It should be noted that the division of processing modules in this embodiment of the present disclosure is illustrative and represents a logical functional division. In actual implementation, alternative divisions may be used.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium, Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM) a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented obstacle avoidance control method for a robot, the method comprising:

obtaining, by a depth camera perception system, envelope motion information of each movable obstacle in a target operating environment in a current control cycle, and accessing a pre-stored actual voxel block position of each environmental obstacle in the target operating environment, wherein the actual voxel block position of each environmental obstacle was measured by the depth camera perception system before the movable obstacles were present in the target operating environment;

determining a plurality of target obstacles that need to be avoided by a plurality of key obstacle-avoidance parts of a target robot in the target operating environment according to all of the envelope motion information and all of the actual voxel block positions;

constructing a Riemannian Motion Policies (RMP) task mapping tree corresponding to a desired operation of the target robot in the target operating environment according to actual voxel block positions or envelope motion information of all of the target obstacles, wherein leaf node tasks of the RMP task mapping tree comprise a robotic joint limit avoidance task, a pose variation task for a robotic end effector to perform the desired operation, and obstacle avoidance motion tasks for the key obstacle-avoidance parts to avoid corresponding target obstacles;

performing global joint acceleration solving based on the RMP task mapping tree to obtain desired joint accelerations of the target robot in the current control cycle according to actual joint state information and desired end-effector posture information of the target robot in the current control cycle that matches the expected operation; and controlling the target robot to move according to the desired joint accelerations.

2. The method of claim 1, wherein obtaining, by the depth camera perception system, envelope motion information of each movable obstacle in the target operating environment in the current control cycle, comprises:

obtaining depth image data captured by the depth camera perception system for the target operating environment in the current control cycle;

for each movable obstacle, determining an actual marker pose of each object marker of the movable obstacle in a robot base coordinate system of the target robot according to the depth image data;

constructing a spherical envelope according to the actual marker pose to obtain an envelope radius and envelope center position of each movable obstacle in the robot base coordinate system;

according to the envelope center position, calculating an envelope center moving speed of each movable obstacle in the robot base coordinate system using a difference method; and determining the envelope center position and envelope center moving speed corresponding to each movable obstacle as the envelope motion information of the movable obstacle in the current control cycle.

3. The method of claim 1, wherein the target obstacles corresponding to the plurality of key obstacle-avoidance parts at least comprise all of the movable obstacles in the target operating environment, and determining the plurality of target obstacles that need to be avoided by the plurality of key obstacle-avoidance parts of the target robot in the target operating environment according to all of the envelope motion information and all of the actual voxel block positions comprises:

for each of the key obstacle-avoidance parts, calculating an actual distance between an actual spatial position of the key obstacle-avoidance part in the current control cycle and the actual voxel block position of each environmental obstacle;

comparing all of the actual distances with a preset threshold;

in response to at least one of the actual distances being less than or equal to the preset threshold, selecting at least one of the environmental obstacles corresponding to the at least one of the actual distances as a target obstacle for the key obstacle-avoidance part;

in response to all of the actual distances being greater than the preset threshold, determining that there is no environmental obstacle among all of the obstacles corresponding to the key obstacle-avoidance part.

4. The method of claim 1, further comprising:

in response to there being no movable obstacles in the target operating environment, controlling a plurality of depth cameras included in the depth camera perception system to respectively capture a plurality of environmental depth images of the target operating environment;

extracting corresponding raw point cloud data from the environmental depth images, and sequentially performing point cloud denoising, point cloud registration, and point cloud removal processing for the target robot on the extracted raw point cloud data, to obtain the environmental point cloud data corresponding to the target operating environment;

performing point cloud voxelization on the environmental point cloud data to obtain actual voxel block sizes and the actual voxel block positions of all of the environmental obstacles in the target operating environment; and storing the actual voxel block positions and actual voxel block sizes of the environmental obstacles in the target operating environment.

5. The method of claim 1, wherein the pose variation task comprises position motion tasks of a center point of the robotic end effector, a first end-effector reference point, and a second end-effector reference point, each of which has a fixed relative pose during execution of the desired operation; the key obstacle-avoidance parts comprise the center point of the robotic end effector and a plurality of target obstacle-avoidance parts; constructing the RMP task mapping tree corresponding to the desired operation of the target robot in the target operating environment according to actual voxel block positions or envelope motion information of all of the target obstacles comprises:

decomposing a global motion task of the target robot in a robot joint space to obtain position change tasks of the center point of the robotic end effector, the first end-effector reference point, the second end-effector reference point, and the target obstacle-avoidance parts in the robot operational space, as well as the robotic joint limit avoidance task in the robot joint space;

for each end-effector reference point of the first end-effector reference point and the second end-effector reference point, decomposing the position change task of the end-effector reference point into a task space of the reference point to obtain the position motion task of the end-effector reference point in the corresponding task space for executing the desired operation;

for the center point of the robotic end effector, based on the actual voxel block positions or envelope motion information of all of the target obstacles corresponding to the center point of the robotic end-effector, decomposing the position change task of the center point of the robotic end effector into a task space of the center point of the robotic end effector to obtain the position motion task for executing the desired operation in the corresponding task space, as well as the obstacle-avoidance motion tasks for each of the target obstacles that needs to be avoided in the corresponding task space of the center point of the robotic end-effector;

for each of the target obstacle-avoidance parts, based on the actual voxel block positions or envelope motion information of all of the target obstacles corresponding to the target obstacle-avoidance part, decomposing the position change task of the target obstacle-avoidance part into the task space of the target obstacle-avoidance part to obtain the obstacle-avoidance motion tasks for each of the target obstacles that need to be avoided in the corresponding task space of the target obstacle-avoidance part; and based on a spatial transformation relationship between the robot joint space, robot operational space, and task space, constructing a tree structure for the global motion task, the robotic joint limit avoidance task, all of the position change tasks, all of the position motion tasks, and all of the obstacle-avoidance motion tasks to obtain the RMP task mapping tree.

6. The method of claim 5, wherein performing global joint acceleration solving based on the RMP task mapping tree to obtain desired joint accelerations of the target robot in the current control cycle according to actual joint state information and desired end-effector posture information of the target robot in the current control cycle that matches the expected operation comprises:

constructing geometric dynamic systems for all of the position motion tasks, each involving end-effector position information and position change velocity information, and constructing geometric dynamic systems for all of the obstacle-avoidance motion tasks, each involving relative distance information and relative motion velocity information between key obstacle-avoidance parts and target obstacles, as well as geometric dynamic system for the robot joint limit avoidance task, which involves joint position information and joint velocity information;

based on an RMP forward propagation operation, transmitting the actual joint state information and the desired end-effector posture information from a root node of the RMP task mapping tree to each of the leaf node tasks, such that each leaf node task can solve for a desired inertia matrix and desired forces based on a corresponding geometric dynamic system to obtain a local desired inertia matrix and local desired forces for each of the leaf node tasks; and based on an RMP backward propagation operation, transmitting reversely local desired inertia matrices and local desired forces of each of the leaf node tasks to the root node for joint acceleration calculation, thereby obtaining the desired joint accelerations of the target robot in the current control cycle.

7. A device comprising:

one or more processors; and a memory coupled to the one or more processors, the memory storing programs that, when executed by the one or more processors, cause performance of operations comprising:

obtaining, by a depth camera perception system, envelope motion information of each movable obstacle in a target operating environment in a current control cycle, and accessing a pre-stored actual voxel block position of each environmental obstacle in the target operating environment, wherein the actual voxel block position of each environmental obstacle was measured by the depth camera perception system before the movable obstacles were present in the target operating environment;

determining a plurality of target obstacles that need to be avoided by a plurality of key obstacle-avoidance parts of a target robot in the target operating environment according to all of the envelope motion information and all of the actual voxel block positions;

constructing a Riemannian Motion Policies (RMP) task mapping tree corresponding to a desired operation of the target robot in the target operating environment according to actual voxel block positions or envelope motion information of all of the target obstacles, wherein leaf node tasks of the RMP task mapping tree comprise a robotic joint limit avoidance task, a pose variation task for a robotic end effector to perform the desired operation, and obstacle avoidance motion tasks for the key obstacle-avoidance parts to avoid corresponding target obstacles;

performing global joint acceleration solving based on the RMP task mapping tree to obtain desired joint accelerations of the target robot in the current control cycle according to actual joint state information and desired end-effector posture information of the target robot in the current control cycle that matches the expected operation; and controlling the target robot to move according to the desired joint accelerations.

8. The device of claim 7, wherein obtaining, by the depth camera perception system, envelope motion information of each movable obstacle in the target operating environment in the current control cycle, comprises:

obtaining depth image data captured by the depth camera perception system for the target operating environment in the current control cycle;

for each movable obstacle, determining an actual marker pose of each object marker of the movable obstacle in a robot base coordinate system of the target robot according to the depth image data;

constructing a spherical envelope according to the actual marker pose to obtain an envelope radius and envelope center position of each movable obstacle in the robot base coordinate system;

according to the envelope center position, calculating an envelope center moving speed of each movable obstacle in the robot base coordinate system using a difference method; and determining the envelope center position and envelope center moving speed corresponding to each movable obstacle as the envelope motion information of the movable obstacle in the current control cycle.

9. The device of claim 7, wherein the target obstacles corresponding to the plurality of key obstacle-avoidance parts at least comprise all of the movable obstacles in the target operating environment, and determining the plurality of target obstacles that need to be avoided by the plurality of key obstacle-avoidance parts of the target robot in the target operating environment according to all of the envelope motion information and all of the actual voxel block positions comprises:

for each of the key obstacle-avoidance parts, calculating an actual distance between an actual spatial position of the key obstacle-avoidance part in the current control cycle and the actual voxel block position of each environmental obstacle;

comparing all of the actual distances with a preset threshold;

in response to at least one of the actual distances being less than or equal to the preset threshold, selecting at least one of the environmental obstacles corresponding to the at least one of the actual distances as a target obstacle for the key obstacle-avoidance part;

in response to all of the actual distances being greater than the preset threshold, determining that there is no environmental obstacle among all of the obstacles corresponding to the key obstacle-avoidance part.

10. The device of claim 7, wherein the operations further comprise:

in response to there being no movable obstacles in the target operating environment, controlling a plurality of depth cameras included in the depth camera perception system to respectively capture a plurality of environmental depth images of the target operating environment;

extracting corresponding raw point cloud data from the environmental depth images, and sequentially performing point cloud denoising, point cloud registration, and point cloud removal processing for the target robot on the extracted raw point cloud data, to obtain the environmental point cloud data corresponding to the target operating environment;

performing point cloud voxelization on the environmental point cloud data to obtain actual voxel block sizes and the actual voxel block positions of all of the environmental obstacles in the target operating environment; and storing the actual voxel block positions and actual voxel block sizes of the environmental obstacles in the target operating environment.

11. The device of claim 7, wherein the pose variation task comprises position motion tasks of a center point of the robotic end effector, a first end-effector reference point, and a second end-effector reference point, each of which has a fixed relative pose during execution of the desired operation; the key obstacle-avoidance parts comprise the center point of the robotic end effector and a plurality of target obstacle-avoidance parts; constructing the RMP task mapping tree corresponding to the desired operation of the target robot in the target operating environment according to actual voxel block positions or envelope motion information of all of the target obstacles comprises:

decomposing a global motion task of the target robot in a robot joint space to obtain position change tasks of the center point of the robotic end effector, the first end-effector reference point, the second end-effector reference point, and the target obstacle-avoidance parts in the robot operational space, as well as the robotic joint limit avoidance task in the robot joint space;

for each end-effector reference point of the first end-effector reference point and the second end-effector reference point, decomposing the position change task of the end-effector reference point into a task space of the reference point to obtain the position motion task of the end-effector reference point in the corresponding task space for executing the desired operation;

for the center point of the robotic end effector, based on the actual voxel block positions or envelope motion information of all of the target obstacles corresponding to the center point of the robotic end-effector, decomposing the position change task of the center point of the robotic end effector into a task space of the center point of the robotic end effector to obtain the position motion task for executing the desired operation in the corresponding task space, as well as the obstacle-avoidance motion tasks for each of the target obstacles that needs to be avoided in the corresponding task space of the center point of the robotic end-effector;

for each of the target obstacle-avoidance parts, based on the actual voxel block positions or envelope motion information of all of the target obstacles corresponding to the target obstacle-avoidance part, decomposing the position change task of the target obstacle-avoidance part into the task space of the target obstacle-avoidance part to obtain the obstacle-avoidance motion tasks for each of the target obstacles that need to be avoided in the corresponding task space of the target obstacle-avoidance part; and based on a spatial transformation relationship between the robot joint space, robot operational space, and task space, constructing a tree structure for the global motion task, the robotic joint limit avoidance task, all of the position change tasks, all of the position motion tasks, and all of the obstacle-avoidance motion tasks to obtain the RMP task mapping tree.

12. The device of claim 11, wherein performing global joint acceleration solving based on the RMP task mapping tree to obtain desired joint accelerations of the target robot in the current control cycle according to actual joint state information and desired end-effector posture information of the target robot in the current control cycle that matches the expected operation comprises:

constructing geometric dynamic systems for all of the position motion tasks, each involving end-effector position information and position change velocity information, and constructing geometric dynamic systems for all of the obstacle-avoidance motion tasks, each involving relative distance information and relative motion velocity information between key obstacle-avoidance parts and target obstacles, as well as geometric dynamic system for the robot joint limit avoidance task, which involves joint position information and joint velocity information;

based on an RMP forward propagation operation, transmitting the actual joint state information and the desired end-effector posture information from a root node of the RMP task mapping tree to each of the leaf node tasks, such that each leaf node task can solve for a desired inertia matrix and desired forces based on a corresponding geometric dynamic system to obtain a local desired inertia matrix and local desired forces for each of the leaf node tasks; and based on an RMP backward propagation operation, transmitting reversely local desired inertia matrices and local desired forces of each of the leaf node tasks to the root node for joint acceleration calculation, thereby obtaining the desired joint accelerations of the target robot in the current control cycle.

13. A non-transitory computer-readable storage medium storing instructions that, when executed by at least one processor of a device, cause the at least one processor to perform a method, the method comprising:

obtaining, by a depth camera perception system, envelope motion information of each movable obstacle in a target operating environment in a current control cycle, and accessing a pre-stored actual voxel block position of each environmental obstacle in the target operating environment, wherein the actual voxel block position of each environmental obstacle was measured by the depth camera perception system before the movable obstacles were present in the target operating environment;

determining a plurality of target obstacles that need to be avoided by a plurality of key obstacle-avoidance parts of a target robot in the target operating environment according to all of the envelope motion information and all of the actual voxel block positions;

constructing a Riemannian Motion Policies (RMP) task mapping tree corresponding to a desired operation of the target robot in the target operating environment according to actual voxel block positions or envelope motion information of all of the target obstacles, wherein leaf node tasks of the RMP task mapping tree comprise a robotic joint limit avoidance task, a pose variation task for a robotic end effector to perform the desired operation, and obstacle avoidance motion tasks for the key obstacle-avoidance parts to avoid corresponding target obstacles;

performing global joint acceleration solving based on the RMP task mapping tree to obtain desired joint accelerations of the target robot in the current control cycle according to actual joint state information and desired end-effector posture information of the target robot in the current control cycle that matches the expected operation; and controlling the target robot to move according to the desired joint accelerations.

14. The non-transitory computer-readable storage medium of claim 13, wherein obtaining, by the depth camera perception system, envelope motion information of each movable obstacle in the target operating environment in the current control cycle, comprises:

obtaining depth image data captured by the depth camera perception system for the target operating environment in the current control cycle;

for each movable obstacle, determining an actual marker pose of each object marker of the movable obstacle in a robot base coordinate system of the target robot according to the depth image data;

constructing a spherical envelope according to the actual marker pose to obtain an envelope radius and envelope center position of each movable obstacle in the robot base coordinate system;

according to the envelope center position, calculating an envelope center moving speed of each movable obstacle in the robot base coordinate system using a difference method; and determining the envelope center position and envelope center moving speed corresponding to each movable obstacle as the envelope motion information of the movable obstacle in the current control cycle.

15. The non-transitory computer-readable storage medium of claim 13, wherein the target obstacles corresponding to the plurality of key obstacle-avoidance parts at least comprise all of the movable obstacles in the target operating environment, and determining the plurality of target obstacles that need to be avoided by the plurality of key obstacle-avoidance parts of the target robot in the target operating environment according to all of the envelope motion information and all of the actual voxel block positions comprises:

for each of the key obstacle-avoidance parts, calculating an actual distance between an actual spatial position of the key obstacle-avoidance part in the current control cycle and the actual voxel block position of each environmental obstacle;

comparing all of the actual distances with a preset threshold;

in response to at least one of the actual distances being less than or equal to the preset threshold, selecting at least one of the environmental obstacles corresponding to the at least one of the actual distances as a target obstacle for the key obstacle-avoidance part;

in response to all of the actual distances being greater than the preset threshold, determining that there is no environmental obstacle among all of the obstacles corresponding to the key obstacle-avoidance part.

16. The non-transitory computer-readable storage medium of claim 13, wherein the method further comprises:

in response to there being no movable obstacles in the target operating environment, controlling a plurality of depth cameras included in the depth camera perception system to respectively capture a plurality of environmental depth images of the target operating environment;

extracting corresponding raw point cloud data from the environmental depth images, and sequentially performing point cloud denoising, point cloud registration, and point cloud removal processing for the target robot on the extracted raw point cloud data, to obtain the environmental point cloud data corresponding to the target operating environment;

performing point cloud voxelization on the environmental point cloud data to obtain actual voxel block sizes and the actual voxel block positions of all of the environmental obstacles in the target operating environment; and storing the actual voxel block positions and actual voxel block sizes of the environmental obstacles in the target operating environment.

17. The non-transitory computer-readable storage medium of claim 13, wherein the pose variation task comprises position motion tasks of a center point of the robotic end effector, a first end-effector reference point, and a second end-effector reference point, each of which has a fixed relative pose during execution of the desired operation; the key obstacle-avoidance parts comprise the center point of the robotic end effector and a plurality of target obstacle-avoidance parts; constructing the RMP task mapping tree corresponding to the desired operation of the target robot in the target operating environment according to actual voxel block positions or envelope motion information of all of the target obstacles comprises:

decomposing a global motion task of the target robot in a robot joint space to obtain position change tasks of the center point of the robotic end effector, the first end-effector reference point, the second end-effector reference point, and the target obstacle-avoidance parts in the robot operational space, as well as the robotic joint limit avoidance task in the robot joint space;

for each end-effector reference point of the first end-effector reference point and the second end-effector reference point, decomposing the position change task of the end-effector reference point into a task space of the reference point to obtain the position motion task of the end-effector reference point in the corresponding task space for executing the desired operation;

for the center point of the robotic end effector, based on the actual voxel block positions or envelope motion information of all of the target obstacles corresponding to the center point of the robotic end-effector, decomposing the position change task of the center point of the robotic end effector into a task space of the center point of the robotic end effector to obtain the position motion task for executing the desired operation in the corresponding task space, as well as the obstacle-avoidance motion tasks for each of the target obstacles that needs to be avoided in the corresponding task space of the center point of the robotic end-effector;

for each of the target obstacle-avoidance parts, based on the actual voxel block positions or envelope motion information of all of the target obstacles corresponding to the target obstacle-avoidance part, decomposing the position change task of the target obstacle-avoidance part into the task space of the target obstacle-avoidance part to obtain the obstacle-avoidance motion tasks for each of the target obstacles that need to be avoided in the corresponding task space of the target obstacle-avoidance part; and based on a spatial transformation relationship between the robot joint space, robot operational space, and task space, constructing a tree structure for the global motion task, the robotic joint limit avoidance task, all of the position change tasks, all of the position motion tasks, and all of the obstacle-avoidance motion tasks to obtain the RMP task mapping tree.

18. The non-transitory computer-readable storage medium of claim 17, wherein performing global joint acceleration solving based on the RMP task mapping tree to obtain desired joint accelerations of the target robot in the current control cycle according to actual joint state information and desired end-effector posture information of the target robot in the current control cycle that matches the expected operation comprises:

constructing geometric dynamic systems for all of the position motion tasks, each involving end-effector position information and position change velocity information, and constructing geometric dynamic systems for all of the obstacle-avoidance motion tasks, each involving relative distance information and relative motion velocity information between key obstacle-avoidance parts and target obstacles, as well as geometric dynamic system for the robot joint limit avoidance task, which involves joint position information and joint velocity information;

based on an RMP forward propagation operation, transmitting the actual joint state information and the desired end-effector posture information from a root node of the RMP task mapping tree to each of the leaf node tasks, such that each leaf node task can solve for a desired inertia matrix and desired forces based on a corresponding geometric dynamic system to obtain a local desired inertia matrix and local desired forces for each of the leaf node tasks; and based on an RMP backward propagation operation, transmitting reversely local desired inertia matrices and local desired forces of each of the leaf node tasks to the root node for joint acceleration calculation, thereby obtaining the desired joint accelerations of the target robot in the current control cycle.

\* \* \* \* \*